US00RE43457E

(19) United States
(12) Reissued Patent
Anderson et al.

(10) Patent Number: US RE43,457 E
(45) Date of Reissued Patent: Jun. 12, 2012

(54) WINDOW BUCK AND METHOD OF ASSEMBLY

(75) Inventors: Justin J. Anderson, Mendon, UT (US); Bruce W. Anderson, Mendon, UT (US); Thayne J. Anderson, Mendon, UT (US)

(73) Assignees: Justin J. Anderson, Logan, UT (US); Bruce Anderson, Logan, UT (US); Thayne Anderson, Logan, UT (US); Audrey E. Anderson, Logan, UT (US)

(21) Appl. No.: 10/011,249

(22) Filed: Dec. 7, 2001

Related U.S. Patent Documents

Reissue of:
(64) Patent No.: 5,996,293
Issued: Dec. 7, 1999
Appl. No.: 08/857,132
Filed: May 15, 1997

U.S. Applications:
(60) Provisional application No. 60/026,439, filed on Sep. 20, 1996.

(51) Int. Cl.
*E06B 1/04* (2006.01)

(52) U.S. Cl. ..... 52/215; 52/656.5; 52/656.9; 49/504; 249/39

(58) Field of Classification Search ..... 52/213, 52/215, 656.9, 656.5, 656.6, 745.15, 786.1, 52/786.13, 211, 171.1, 730.4; 249/39, 504; 114/173, 177; 244/129.3; D25/124; 403/292; 49/DIG. 2, 504; 138/115
See application file for complete search history.

(56) References Cited

U.S. PATENT DOCUMENTS 2,237,696 A * 4/1941 Biederman ..... 49/41
2,893,235 A * 7/1959 Goldberg
2,989,788 A * 6/1961 Kessler
3,105,274 A * 10/1963 Armstrong ..... 52/204.593
3,131,793 A 5/1964 Bohn
3,327,766 A * 6/1967 Kurz ..... 160/381
3,429,602 A * 2/1969 Dirilgen ..... 403/295

(Continued)

FOREIGN PATENT DOCUMENTS

CA 1146418 5/1983

(Continued)

OTHER PUBLICATIONS

Photo 1: This photo shows the frame laying on a floor. It has 4 sides so labeled in red ink.*
Photo 2: This phot shows the frame standing upright. The up direction is marked on the front in red ink.*
Photo 3: This is a close up of one corner of the frame of photos 1 and 2 from the front. The sides are marked in red ink.*

(Continued)

*Primary Examiner* — Robert Canfield
(74) *Attorney, Agent, or Firm* — Hayes Soloway P.C.

(57) ABSTRACT

A window buck is formed of side walls that are extruded from vinyl. The side walls have interior channels. The side walls may be formed to effect a female-male connection between the ends of two adjoining side walls. Alternatively a locking member is provided that is sized to frictionally engage a selected channel. The edges of the side members are shaped for abutment to each other with a connector in the channels to hold the window buck together. The window buck thereafter may be placed before the cement wall is formed and is sized to receive a window frame. The window buck may be formed into selected geometric shapes. Window bucks of different dimensions may be assembled by selected sides of different dimensions from bins or pallets of presized side members.

23 Claims, 15 Drawing Sheets

U.S. PATENT DOCUMENTS

| | | | | | |
|---|---|---|---|---|---|
| 3,556,626 | A | * | 1/1971 | Schock | 312/348.1 |
| 3,687,512 | A | * | 8/1972 | Alston | 312/348.2 |
| 3,835,586 | A | | 9/1974 | Gates et al. | |
| 3,866,380 | A | * | 2/1975 | Benson | 52/656.6 |
| 3,901,572 | A | * | 8/1975 | Litchfield | 312/348.2 |
| 3,995,843 | A | | 12/1976 | Kasterler | |
| 4,006,513 | A | * | 2/1977 | Offterdinger | 16/99 |
| 4,074,480 | A | * | 2/1978 | Burton | 52/127.1 |
| 4,145,150 | A | * | 3/1979 | Rafeld | 403/295 |
| 4,205,486 | A | * | 6/1980 | Guarnacci | 49/501 |
| 4,296,587 | A | * | 10/1981 | Berdan | 52/786.1 |
| 4,370,830 | A | * | 2/1983 | Schaefer et al. | 49/413 |
| 4,430,831 | A | * | 2/1984 | Kemp | |
| 4,589,624 | A | * | 5/1986 | Jones | |
| 4,624,091 | A | * | 11/1986 | Biro | 52/656.5 |
| 4,630,386 | A | * | 12/1986 | Wilson | 40/734 |
| 4,683,634 | A | * | 8/1987 | Cole | 29/412 |
| 4,831,804 | A | * | 5/1989 | Sayer | 52/475.1 |
| 4,850,175 | A | * | 7/1989 | Berdan | 52/786.13 |
| 4,944,118 | A | * | 7/1990 | Biro | |
| 4,986,044 | A | * | 1/1991 | Funari | 52/213 |
| 5,059,057 | A | * | 10/1991 | Graef | 403/298 |
| 5,079,860 | A | * | 1/1992 | Nugent | 40/780 |
| 5,090,168 | A | * | 2/1992 | Fast et al. | |
| 5,095,672 | A | * | 3/1992 | Tanikawa | |
| 5,148,649 | A | * | 9/1992 | Cipriano | 52/656.5 |
| 5,157,881 | A | * | 10/1992 | Tashman et al. | 52/98 |
| 5,169,544 | A | * | 12/1992 | Stanfill et al. | |
| 5,239,797 | A | * | 8/1993 | Oldendorf | |
| D343,239 | S | * | 1/1994 | Moss et al. | D25/124 |
| 5,319,884 | A | * | 6/1994 | Bergeron | 49/504 |
| 5,444,947 | A | * | 8/1995 | Miller | |
| 5,522,196 | A | * | 6/1996 | Conroy et al. | |
| 5,791,103 | A | * | 8/1998 | Coolman et al. | |
| 5,881,525 | A | * | 3/1999 | Riegelman et al. | 52/656.7 |
| 5,996,293 | A | * | 12/1999 | Anderson et al. | 52/215 |
| 6,070,375 | A | * | 6/2000 | Anderson et al. | 52/204.54 |
| 6,209,269 | B1 | * | 4/2001 | Valderrama | 52/171.3 |
| 6,217,482 | B1 | * | 4/2001 | Yoo et al. | 482/10 |

FOREIGN PATENT DOCUMENTS

| | | |
|---|---|---|
| DE | 2117645 | 10/1972 |
| DE | 7228233 | 2/1973 |
| DE | 2164521 | 6/1973 |
| DE | 2218931 | 10/1973 |
| DE | 9300299 | 3/1993 |
| DE | 4437816 | 3/1995 |
| EP | 0679792 | 11/1995 |
| FR | 2685026 | 6/1993 |
| FR | 2726842 | 5/1996 |
| GB | 2285653 | 7/1995 |
| WO | WO 9606252 | 2/1996 |

OTHER PUBLICATIONS

Photo 4: This is a close up of the corner of the frame from a position above it and to the side. The sides are marked in red ink. The right side is shown in detal.*

Photo 5: This is a close up of the corner of the frame from a position above it and to the side. The sides are marked in red ink. The left side is shown in detail.*

* cited by examiner

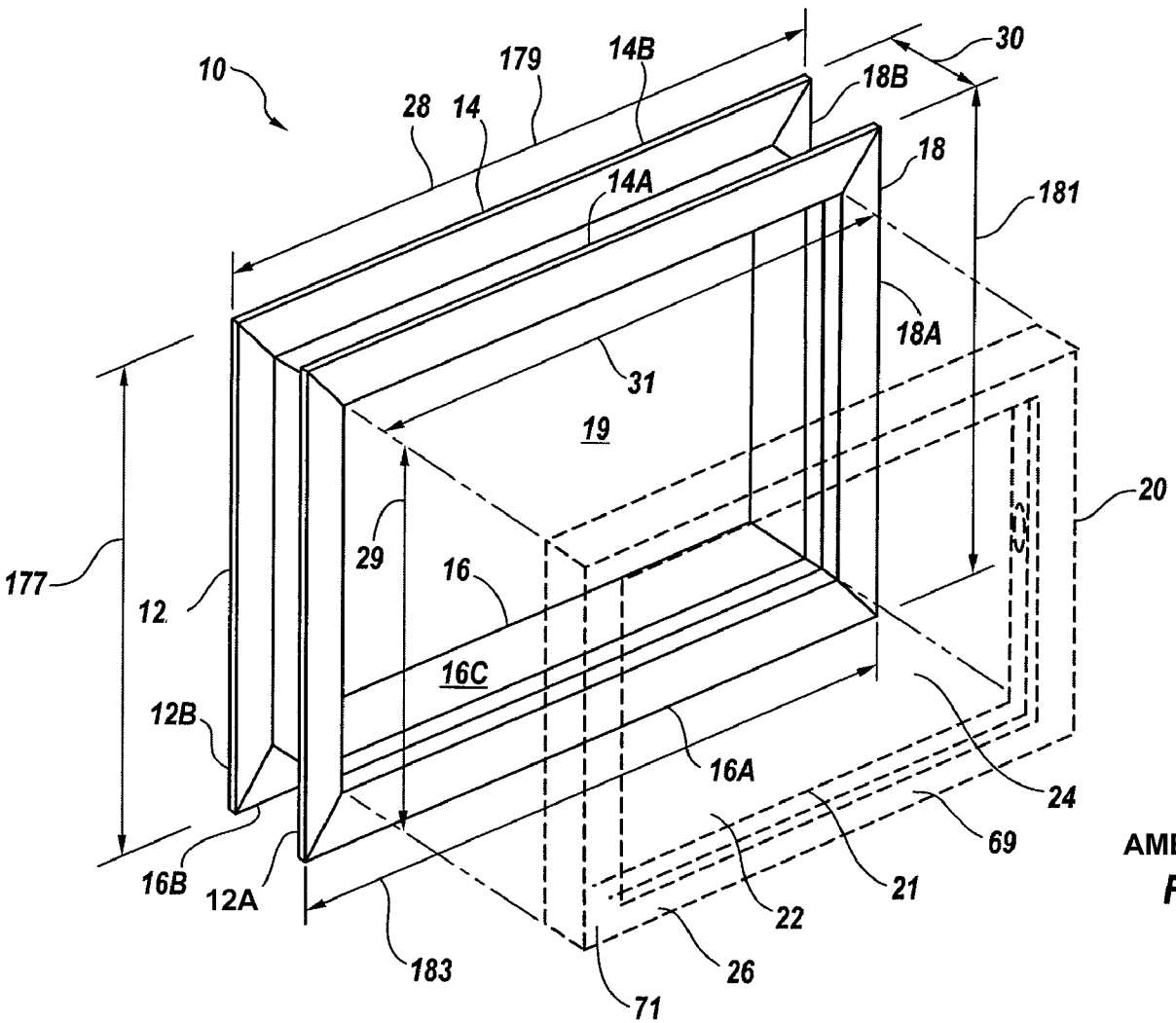
AMENDED
Fig. 1

WINDOW BUCK AND METHOD OF ASSEMBLY

Matter enclosed in heavy brackets [ ] appears in the original patent but forms no part of this reissue specification; matter printed in italics indicates the additions made by reissue.

This application claims the benefit of U.S. provisional application No. 60/026,439 filed Sep. 20, 1996.

BACKGROUND OF THE INVENTION

1. Field of the Invention

The present invention relates to window bucks used for forming a window opening in a wall such as a poured concrete wall.

2. State of the Art

When constructing a building, it is frequently desirable to position a window in a wall such as a poured concrete wall. Procedures for forming an opening have included manufacturing an oversized window form and positioning it within a pair of forms used for forming a concrete wall. Typically, the window form is positioned between the pair of forms after which the concrete is poured into the form and about the window form. Therefore, the opening is defined in the wall when the concrete hardens or cures. Thereafter, the window form has been removed and replaced with structure that is used to size the opening and to provide structure for receiving and attaching the window unit itself.

U.S. Pat. No. 4,430,831 discloses a window buck formed of a series of sides or channels joined together with nails in an end-to-end relationship to define a rectangular opening. The window buck is a window form which is assembled and positioned so that concrete may be poured around it. U.S. Pat. No. 4,589,624 (Jones) also shows a window buck which is provided for forming a window opening in a cast concrete wall. The buck is removable after the concrete wall is formed in order to proceed with further installation of a window.

U.S. Pat. No. 5,169,544 (Stanfill et al.) also describes a buck for use in construction. The buck has internal bracing so that it does not deform or change dimension when the concrete wall is poured about it.

In order to facilitate construction, it would be desirable to have a buck which can be easily assembled on site and which thereafter can be installed and remain in place. The buck would preferably be one that is easily sized and shaped and also which is formed to receive a finished window after the concrete wall has been poured.

SUMMARY

A window buck for forming a window frame opening in a wall includes side member means assembled to define a window frame opening. The side member means is formed to have a perimeter and a width. The width is substantially the width of the wall into which the window buck is to be placed. Internal channels are formed side by side in the side member means and extend along the perimeter between the opposite ends of the side member means.

A connector means for holding at least two ends in abutment with each other is provided. In one embodiment the connector means has a locking member with a first member sized and shaped for insertion into a selected one of the plurality of channels in one of the two ends. The locking member has a second member sized and shaped for frictional insertion into and engagement with a corresponding selected one of the plurality of channels. Both the first member and the second member of the locking member have friction means to frictionally engage the selected channel in one end and the corresponding channel in the other end of the side member means.

Desirably the side member means includes a plurality of separate side members each having two ends. Each of the ends is configured for connection to an end of another side member. The connector means includes a plurality of locking members for joining the ends of each of the separate sides in an abutting relationship to define the perimeter of a window buck with multiple side members.

In an alternative configuration, the side member means is formed to define a circular perimeter. In yet another arrangement, four separate side members of the side member means are assembled to define a rectilinearly shaped window buck.

In an alternate and preferred embodiment, the side member means include a first end and a second end. The connector means are formed in the first end and the second end of adjoining side members for mechanically connecting the first end of one side member to the second end of another side member. Preferably the connector means includes male structure formed proximate one of the first end or the second end of the first side member configured to interconnect to female structure formed proximate one of the first end or second end of a second side member.

Preferably the [male] *female* structure is slot structure and the [female] *male* structure is tongue structure extending outwardly and sized to snugly fit into the slot. Each side member desirably has an internal surface that has a width. The slot is formed in the internal surface transverse to the side member or to extend between the inner surface and outer surface of the wall in which the window buck is to be placed. Each side member may have a plurality of channels. Each of the channels has multiple walls one of which is the internal surface. Preferably, the tongue structure is formed from one of the walls of one or more channels by removing other material of the channels.

In preferred configurations, the side members may have an internal flange positioned to extend along the internal surface of the wall and an external flange to extend along the external surface of the wall. The external flange may extend a distance so that fasteners may be positioned therethrough to position the window buck at a desired location in the cement forms before the wall is poured or formed.

Methods of forming a window opening in a cement wall and methods of forming a window buck involve forming a window buck and positioning the window as part of the wall forming process. In preferred methods, a plurality of first side members have slots formed at one end to connect with tongues formed in the second end of second side members. The tongues formed in the first ends of the second side members connect to slots formed in the second ends of the first side members. Window bucks of different dimensions may preferably and alternatively be formed from stock piles of first side members, second side members and third side members. Cross braces may also be provided to support a window buck during formation of the wall.

BRIEF DESCRIPTION OF THE DRAWINGS

In the drawings which illustrate what are presently regarded to be the best modes of carrying out the invention, FIG. 1 is a window buck of the present invention with a proposed window frame for insertion therein depicted in phantom;

DETAILED DESCRIPTION OF THE ILLUSTRATED EMBODIMENT

Figure 2:
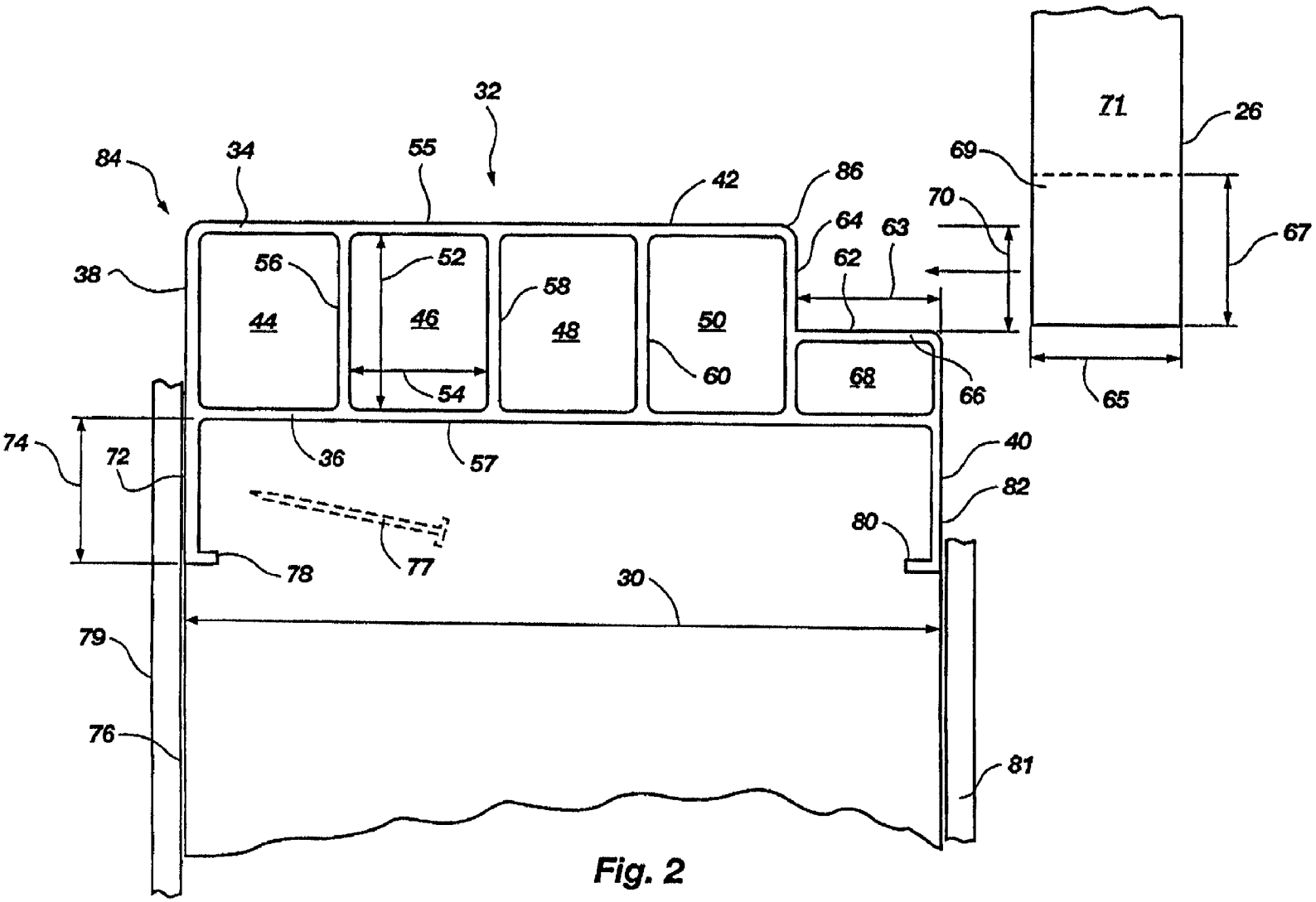
FIG. 2 is a cross-section of a side member for use with the window buck of the present invention.

In FIG. 1, one embodiment of a window buck 10 has side member means which may include one (FIG. 6) or a plurality of side members. In FIG. 1, the window buck 10 is rectilinear in projection with a left side member 12, top side member 14, bottom side member 16 and a right side member 18. A window 20 is shown in phantom sized for positioning within the window buck 10 after construction of a wall as more fully discussed hereinafter. The window 20 as shown has a left window pane unit 22 and a right window pane unit 24, both of which slide in a track 21 attached to the frame 26.

Figure 3:
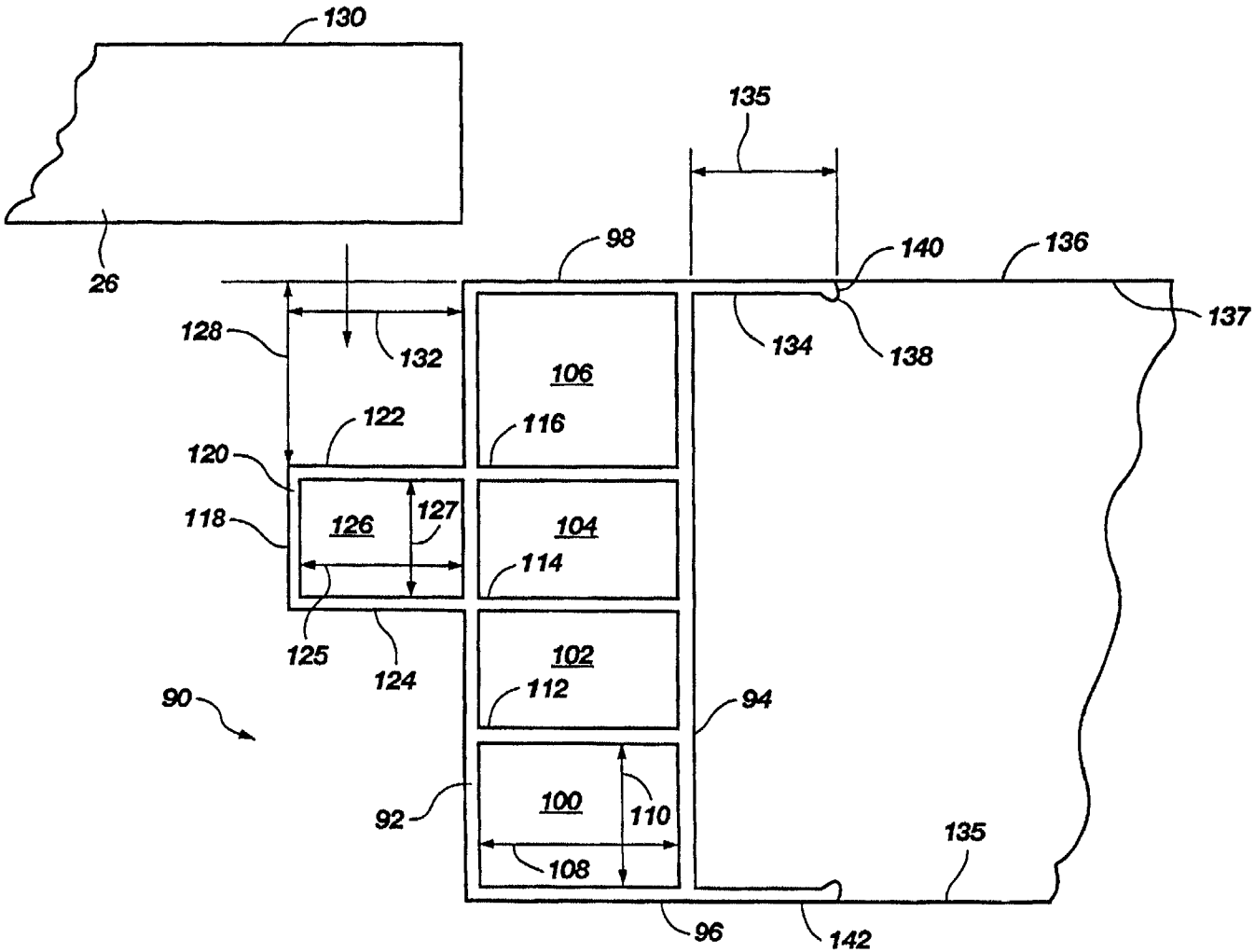
FIG. 3 is a cross section of an alternative side member for use with the window buck of the present invention.

The left side member 12, the top side member 14, the bottom side member 16 and the right side member 18 are each formed to have a length 28 and a width 30. The length 28 and width 30 is selected to define a window opening of the desired size and configuration and more particularly of a height 29 and a width 31 that is for a standard sized or commercially available window 20. The width 30 is selected to be substantially the width of the wall into which the window buck 10 is to be placed. That is, the width 30 is selected so that the internal flanges 12A, 14A, 16A and 18A are exposed and extend along the inner surface 137 of the wall 136 (FIG. 3). Similarly, external flanges 12B, 14B, 16B and 18B are exposed and extend along the outer surface 135 of wall 136.

The left side member 12, the top side member 14, the bottom side member 16 and the left side member 18 are each formed preferably of a vinyl material that is extruded. However, they may be formed from other materials including aluminum, aluminum alloys, and other plastics. The preferred material is low cost and resistant to corrosion while having sufficient structural strength to support, for example, the cement when the wall is formed.

FIG. 2 shows a side member 32 which has a top wall 34 and a bottom wall 36. It also has a first outside wall 38 and a second outside wall 40. The top wall 34 defines an interior surface 42 of the window buck and, in turn, provides a surface that faces toward the interior of the buck which is the opening 19 defined by the buck and the window (e.g., window 20) installed therein. The inwardly facing surface 16C of the bottom side member 16 acts as a window sill.

Between the top wall 34 and the bottom wall 36 is a plurality of channels 44, 46, 48 and 50. Each of the channels 44, 46, 48 and 50 is sized and shaped to be substantially the same in height 52 and width 54. Separating walls 56, 58, 60 and 64 are formed in-between the top wall 34 and the bottom wall 36 to define the channels 44, 46, 48 and 50 and to strengthen the side member 32 so that it is structurally strong and has sufficient rigidity to maintain dimensional integrity when in use. That is, each channel 44, 46, 48 and 50 has a plurality of sidewalls each of which is preferably rectangular in projection with four sidewalls such as sidewalls 56 and 58 as well as sidewalls 55 and 57 which are part of the interior surface 42 and the bottom wall 36.

As can be seen in FIG. 2, the top wall 34 steps down to a ledge 62 defined by the separating wall 64 and a ledge wall 66 as well as the second outside wall 40. The ledge 62, second outside wall 40 and ledge wall 66 as well as the bottom wall 36 together define a smaller channel 68 as shown.

The frame 26 of the window 20 is sized so it can be slid into position on the ledge 62 and for abutment against the separating wall 64 to, in turn, provide for installation of the window 20 within the window buck 10 defined by the left side member 12, the top side member 14, the bottom side member 16 and the right side member 18. It may be noted that the ledge 62 is spaced a distance 70 below the top wall 34. The distance 70 is selected to provide for some dimensional variations in the window frame 26 while still providing an appropriately sufficient amount of surface of the separating wall 64 to facilitate installation using screws, nails, glue or the like. The distance 70 is also preferably selected to be less than the height 67 of the lower element 69 of the frame 26. The ledge 62 has a width 63 that is preferably at least the width 65 of the separate members of the frame 26 such as members 69 and 71.

In FIG. 2 it can also be seen that the side member 32 has a lower portion 72 of the first outside wall 38 which functions as an outside flange and which extends below the bottom wall 36 a distance 74, which is comparable to the height 52 of the channels 44, 46, 48 and 50. The distance 74 may vary as desired by the user to provide for sufficient connection to the cement wall 76 when the concrete (or the like) used to form the wall 76 dries after being poured. That is, the distance 74 of the portion 72 is selected to provide for a rigid attachment to the cement wall 76. It is also selected so that fasteners such as nail 77 may be used to secure the window buck to a fiberglass external cement form 79 used to define, with internal cement form 81, a cavity or void into which cement is poured to form the wall 76. The finger 78 associated with the lower portion 72 of the first outside wall 38 and the finger 80 associated with lower portion 82 of the second outside wall 40 extend inwardly in order to rigidly secure the side member 32 and, more particularly, the window buck 10 in place after the concrete hardens or solidifies to form wall 76.

It may be noted that side member 32 may be formed of an extruded vinyl material. When extruded, it may have rounded corners such as the left corner 84 and the right corner 86. The rounding of corners is not necessary. They may be formed in any manner desired to facilitate assembly and construction and an appearance desired by the user.

Referring now to FIG. 3, an alternative side member 90 is illustrated in cross-section. The side member 90 has a top wall 92 and a bottom wall 94. It also has a left wall 96 and a right wall 98. In the space between the left wall 96 and the right wall 98 is a plurality of channels 100, 102, 104 and 106, each sized and shaped to have essentially the same height 108 and essentially the same width 110. Each of the channels 100, 102, 104 and 106 is separated by a separating wall such as walls 112, 114, and 116 as shown. Extending above the top wall 92 is abutment member 118. The abutment member 118 has a top wall 120 and opposite side walls 122 and 124 positioned to define a channel 126, which may be dimensioned in height 125 and width 127 the same as the height 108 and width 110 of the other channels 100, 102, 104 and 106.

The abutment member 118 is positioned spaced a distance 128 from the right wall 98 so that the frame 26 of a window 20 can be received with the outer wall 130 of the frame 26 being in general alignment with the right wall 98. Similarly, the abutment member 118 is sized to have a height 132 to provide for dimensional variances in the frame 26 of the window 20.

It may also be noted that the right wall 98 has an interior flange or extension 134 which extends below the bottom wall 94 a distance 135 selected to provide for secure attachment of the side member 90 to the cement wall 136. It may be noted that the extension 134 also has a bead or node 138 formed at its distal end 140 to facilitate secure attachment of the side member 90 to the cement wall 136. The left wall 96 has a similar flange or extension 142 sized in length comparable to the extension 134 of the right side wall 98. Even though the extensions 134 and 142 are noted to be substantially the same in length, they may differ if desired.

Figure 4:
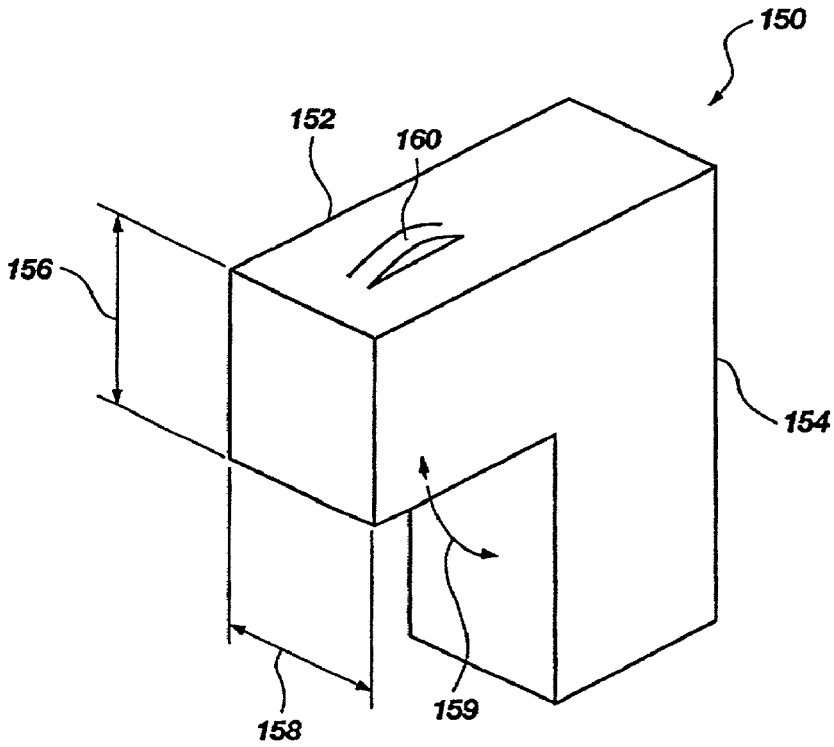
FIG. 4 is a perspective view of a locking member for use in connecting side member means of a window buck of the present invention.
Figure 5:
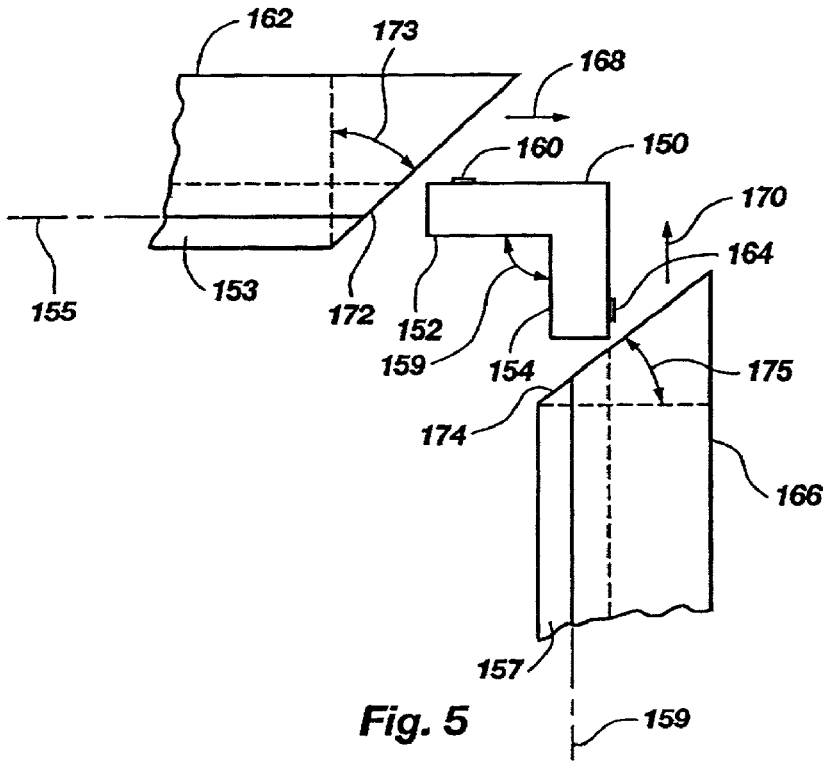
FIG. 5 is an exploded, partial side view of separate side members of the side member means of a window buck of the present invention with a locking member positioned for interconnecting the illustrated separate side members.

FIG. 4 shows a locking member 150 which may be used to interconnect adjoining side members as illustrated in FIG. 5. More specifically, FIG. 4 shows a locking member 150 for use in assembling two side members 162 and 166 as illustrated in FIG. 5. The locking member 150 is formed to have a first member or leg 152 and a second member or leg 154 oriented at a right angle to each other. The legs 152 and 154 are sized in height 156 and in width 158 to be comparable to the height 52 and width 54 of the channels 44, 46, 48 and 50 of the side member 32 of FIG. 2 or the height 108 and width 110 of channels 100, 102, 104 and 106 of side member 90. The legs 152 and 154 are similarly dimensioned in height 108 and width 110 so that the legs 152 and 154 may frictionally engage and be inserted into one selected channel 100, 102, 104 and 106, or a selected one of channels 44, 46, 48 and 50.

As can be seen in FIG. 4, the leg 152 has a raised portion 160 which frictionally engages the interior surface of the selected one of channels 44, 46, 48 and 50, or channels 100, 102, 104 and 106, to provide for a more rigid, secure connection.

As best seen in FIG. 5, the leg 152 is inserted into a selected channel of the side member 162. The leg 152, with the raised portion 160, frictionally engages the interior of the selected channel 153 along axis 155. Similarly, leg 154, with a raised portion 164, frictionally engages a channel 157 in an adjoining side member 166 along axis 159. The side members 162 and 166 are urged toward each other and into abutment 168 and 170 with corresponding abutting edges 172 and 174 formed at an angle 173 and 175 selected to provide for abutment. The angle 173 and 175 presently preferred is 45°.

Inasmuch as multiple channels are provided in the side member 32 and the side member 90, it can be seen that one or more locking members 150 may be inserted into two or more of the [coaxial] *side by side* channels, such as channels 44, 46, 48 and 50, or channels 100, 102, 104 and 106, to provide for a rigid connection between multiple channels of adjoining side members of a particular window buck.

More specifically, locking members, such as locking member 150, are positioned in-between to connect, for example, the left side member 12 with the top side member 14, and the top side member 14 to the right side member 18. Similar locking members 150 are used to interconnect the bottom side member 16 with the left side member 12 and the right side member 18 at their respective corners.

Obviously, the window buck 10 may be shaped and sized in height 177 and in width 179 (FIG. 1) as desired. That is, height 177 and width 179 may be selected to receive conventional or preassembled windows such as window 20. In selected circumstances, the user may take a length of side wall and cut it to a desired dimension to form a window of desired dimensions and assemble it using a locking member, such as locking member 150 of FIG. 4 or other suitably formed locking members. After the concrete wall 76 (136) is formed, a window 20 can be constructed and installed in any available opening with extensions such as extensions 134 and 142 (FIG. 3) frictionally engaging the wall 136. A window buck 10 may also be used in wooden, block and brick walls as well as walls of other materials.

Preferably, the left side member 12, the top side member 14, the bottom side member 16 and the right side member 18 (FIG. 1) may all be precut and assembled in a carton with the necessary locking members 150 so that a user may simply assemble the window buck 10 on site prior to installation. Therefore, the window buck 10 may be easily stored before use because it is disassembled, reducing the amount of space necessary for shipment and minimizing the amount of damage occurring during transportation to and minimizing storage requirements on the construction site prior to installation.

Figure 6:
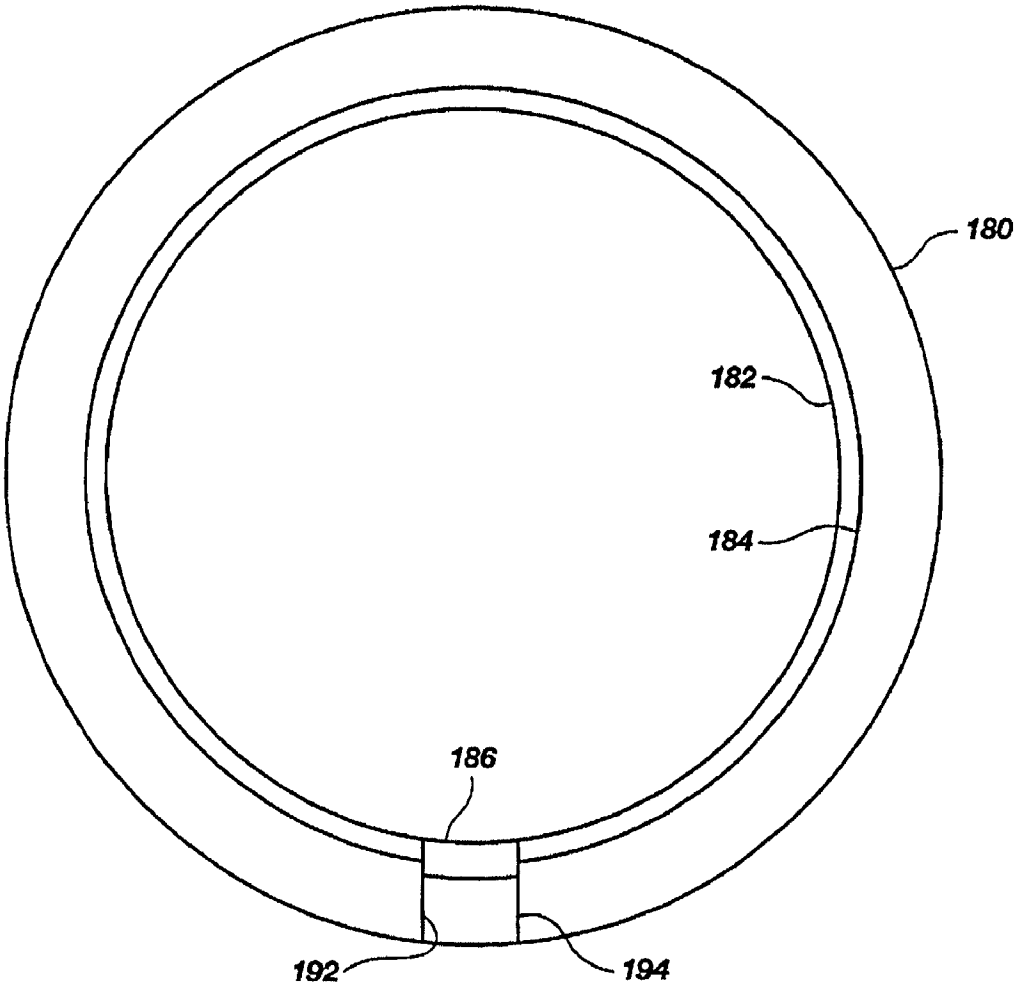
FIG. 6 is a top view of a circular shaped window buck of the present invention.
Figure 7:
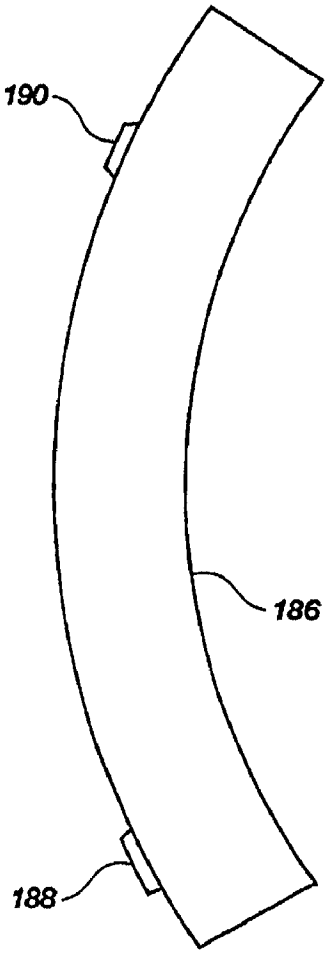
FIG. 7 is a locking member for use with a window buck of FIG. 6.

FIG. 6 shows a side member 180 which is shaped to be circular in projection. It has an interior wall 182 with a ledge 184 so that in cross-section it is similar to the cross-section shown in FIG. 2. The locking member 186, shown in FIG. 7, also is sized and shaped to fit within an interior channel formed in the side member 180. The locking member 186 has a left raised portion 188 and a right raised portion 190 to provide for frictional engagement within the selected channel of the side member 180. As can be seen, the side member 180 has a first end 192 configured to abut the other end 194 when assembled with the locking member 186 interiorly positioned within a selected channel. A plurality of locking members 186 may be used if desired with a plurality of channels formed within the side member 180.

It should also be recognized that the side members such as left side member 12, top side member 14, bottom side member 16 and right side member 18 may be cut and assembled into shapes other than the rectilinear shape shown in FIG. 1. That is, locking members having an angle 159 other than 90° may be used to develop geometric shapes that may be triangular, diamond shaped, octagonal, or some other polygon with a perimeter. That is, the perimeter of the window buck 10 of FIG. 1 includes the length 28 and the height 177, as well as height 181 and width 183 for a rectilinear window buck 10 and window 20. Alternatively, side members may be formed in half circle sections or other geometric forms and used with curvilinear or straight sections in-between to develop a substantially elliptical window buck or window buck of any desired shape.

Although the window buck is herein stated to be formed of an extruded vinyl, other materials may be used including, in some cases, aluminum if desired. However, the preferred material is vinyl or vinyl-type material or vinyl-like material. Vinyl is preferred because it is strong yet not brittle. It can be cleaned, does not need to be pointed or preserved and can be nailed or glued. Also, it can be cut with a saw or similar cutting tool.

It may be also noted that the channels 44, 46, 48 and 50, as well as the channels 100, 102, 104, 106 as well as channels 68 and 126, may each be filled with an insulation material if desired. Appropriate insulation materials include, for example, an expanded polyurethane foam as well as fiberglass materials or any other similar material that would increase the thermal resistivity to reduce heat loss through the window buck after construction of the window is complete.

In an alternative and more preferred arrangement, the window buck 10 of the invention has at least two side wall members. The sidewall members each have a first end and a second end. One of the first ends and one of the second ends are formed to connect with the other. One end of the side wall member is a female member 200 shown in perspective in FIG. 8. The female member 200 is formed comparable to the side member 32 of FIG. 2 with a substantially similar length 202, height 204 and width 206. It has channels 210, 212, 214 and 216 formed in it along with a side portion 218 and 220 sized to embrace the concrete wall in a manner similar to side member 32. The female member 200 also has a ledge 222 formed as shown to receive the window after the concrete wall is poured and hardened.

The female member 200 has a surface 224 facing to the interior of the window buck. The surface has three slots 226, 228 and 230 formed in a line as shown. Each slot 226, 228, 230 has a width 232 and a length 234 substantially the same and selected to snugly receive corresponding tongues from the male member 240 shown in FIG. 9 as discussed hereinafter. Each slot 226, 228 and 230 extends through the surface 224. The slots 226, 228 and 230 are each spaced a distance 236 selected to correspond to the width of channels formed in the male member as discussed hereinafter.

The female side member 200 has two ends, which are the same except for their orientation. The female side member 200 may come in a length 202 larger than needed for a desired window buck and in turn may be cut to form an essentially straight end 238. That is, the end 238 is substantially planar and presents what could be said to be an effectively flat surface.

The female side member 200 may be formed with the slots 226, 228 and 230 preformed and spaced in a plurality of rows such as rows 237 and 239 along the entire length 202 of the female side member. Alternatively, the slots 226, 228 and 230 may be formed on site by cutting using an appropriate tool (e.g. a chisel or drill) or by pressing out fillers that are formed by making scribe marks during formation of the female side member 200 so that upon application of a force (e.g., pressing with a punch or screw driver tip) the filler breaks along the scribed lines to thereby form the desired slots such as slots 226, 228 and 230 or other slots in other rows such as rows 237 and 239. The scribed lines shown by dotted line for the slots of rows 237 and 239 such as slot 235 are weakened portions of the surface so that application of pressure causes the filler such as filler 233 to easily separate and cause the desired slot to appear.

Figure 9:
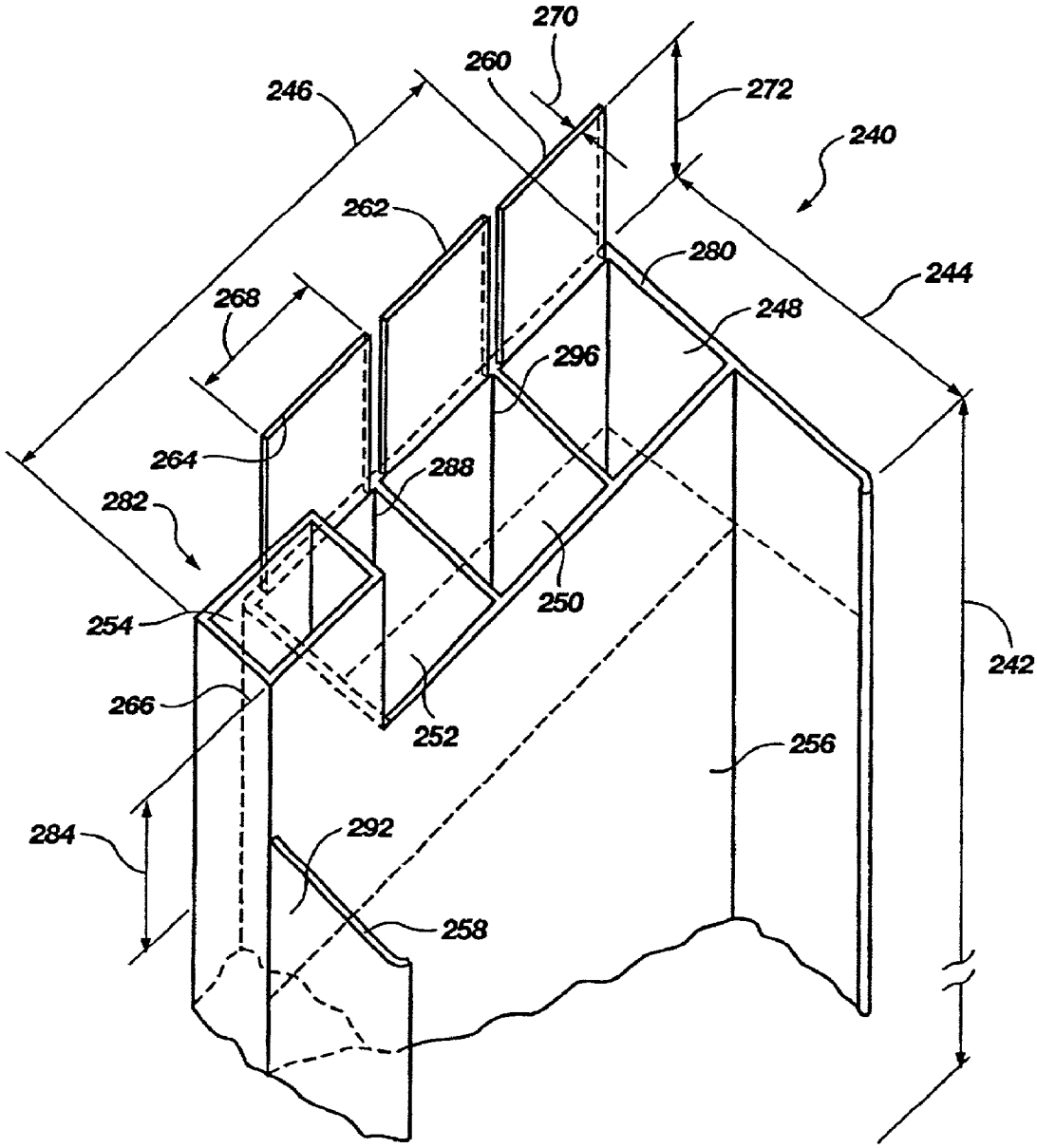
FIG. 9 is a partial perspective view of a male side member of an alternative embodiment of the present invention.

Referring now to FIG. 9, a side member has one end formed to connect to one other end of an adjoining member. The side member is a male side member 240 shown in partial perspective with a length 242, height 244 and width 246 comparable to member 32 of FIG. 2. It is formed with channels 248, 250, 252 and 254 comparable to the channels formed in the side member 32 of FIG. 2. The male side member 240 also has side portions 256 and 258 to embrace the concrete wall when it is formed.

The male side member 240 also has three tongues 260, 262 and 264 extending upwardly from and along the interior surface 266. The tongues 260, 262 and 264 are each substantially the same in dimension and have a length 268 and a width 270 selected to snugly register with the corresponding slots 226, 228 and 230 of the female side member 200. The tongues 260, 262 and 264 are sized in height 272 to extend into the respective channels 210, 212 and 214 of the female member and to either contact the interior surface 276 of those channels or be short of it. That is, the channels 210, 212 and 214 have a depth 278; and the height 272 of the tongues is the same as the depth 278 or slightly less so the end 280 of the male member can snugly abut the surface 224 of the female member. That is, the end 280 of the male side member 240 is planar or flat in section and therefore can snugly abut the interior facing surface 224 of the female side member 200 when the male side member 240 and the female side member 200 are assembled.

Figure 10:
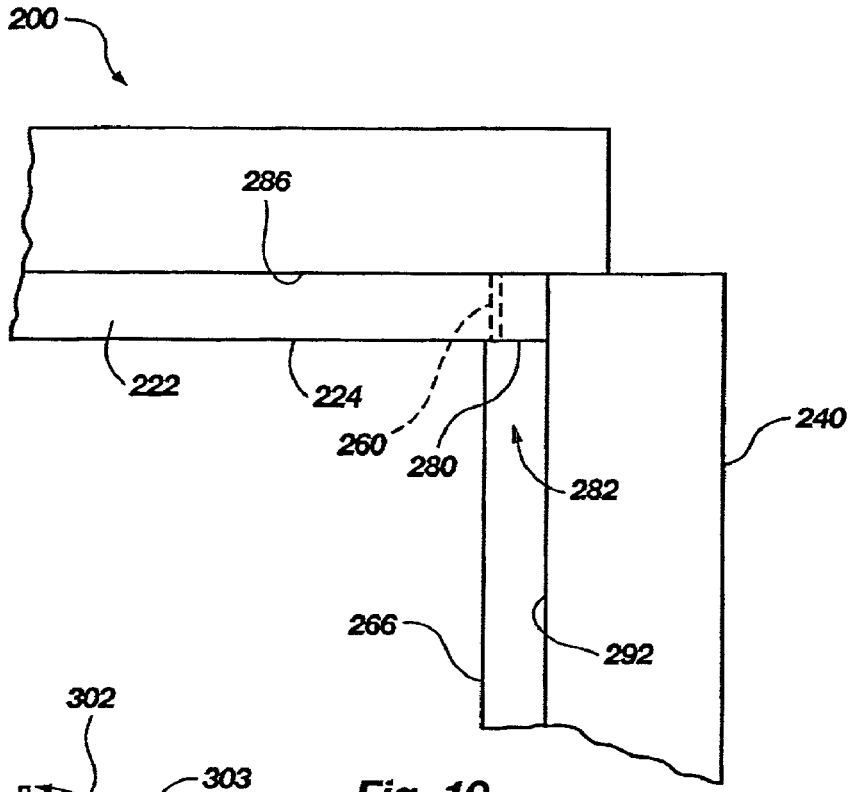
FIG. 10 is a partial front view of an assembled female side member and male side member of an alternative embodiment of the present invention.

As shown in FIG. 10, the female side member 200 and the male side member 240 are joined at their ends. The tongues 260, 262 and 264 together with the corresponding slots 226, 228 and 230 constitute connection means for attaching one end of the female side member 200 to one end of the male side member 240. More specifically, the tongues 260, 262 and 264 are inserted into the slots 226, 228 and 230. The tongues 260, 262 and 264 are urged into the slots 226, 228 and 230 until the surface 280 abuts the surface 224. The sides of the channels 248, 250 and 252 all abut the surface 224 and function as part of the connection means to mechanically limit angular rotation and twisting of the female side member 200 relative to the male side member 240 and vice versa.

As can be seen in FIGS. 9 and 10, the male side member 240 also has a ledge 282 which can be said to be defined and formed by the channel member 254 and the side wall of the channel 252. In order to have a smooth corner in the window buck formed of two male side members and two female side members, the channel 254 is cut to extend a height 284 which is selected to abut the side surface 286 of the ledge 222 and in turn form a clean and snug corner.

In order to form the tongues such as tongues 260, 262 and 264, the male side member may be cut on site to create them. Alternatively they may be formed by removing filler pieces 288 and 290 and separating them from associated structure such as the side portion 256 and the side surface 292 along scribes or perforations indicated by dotted lines.

Figure 8:
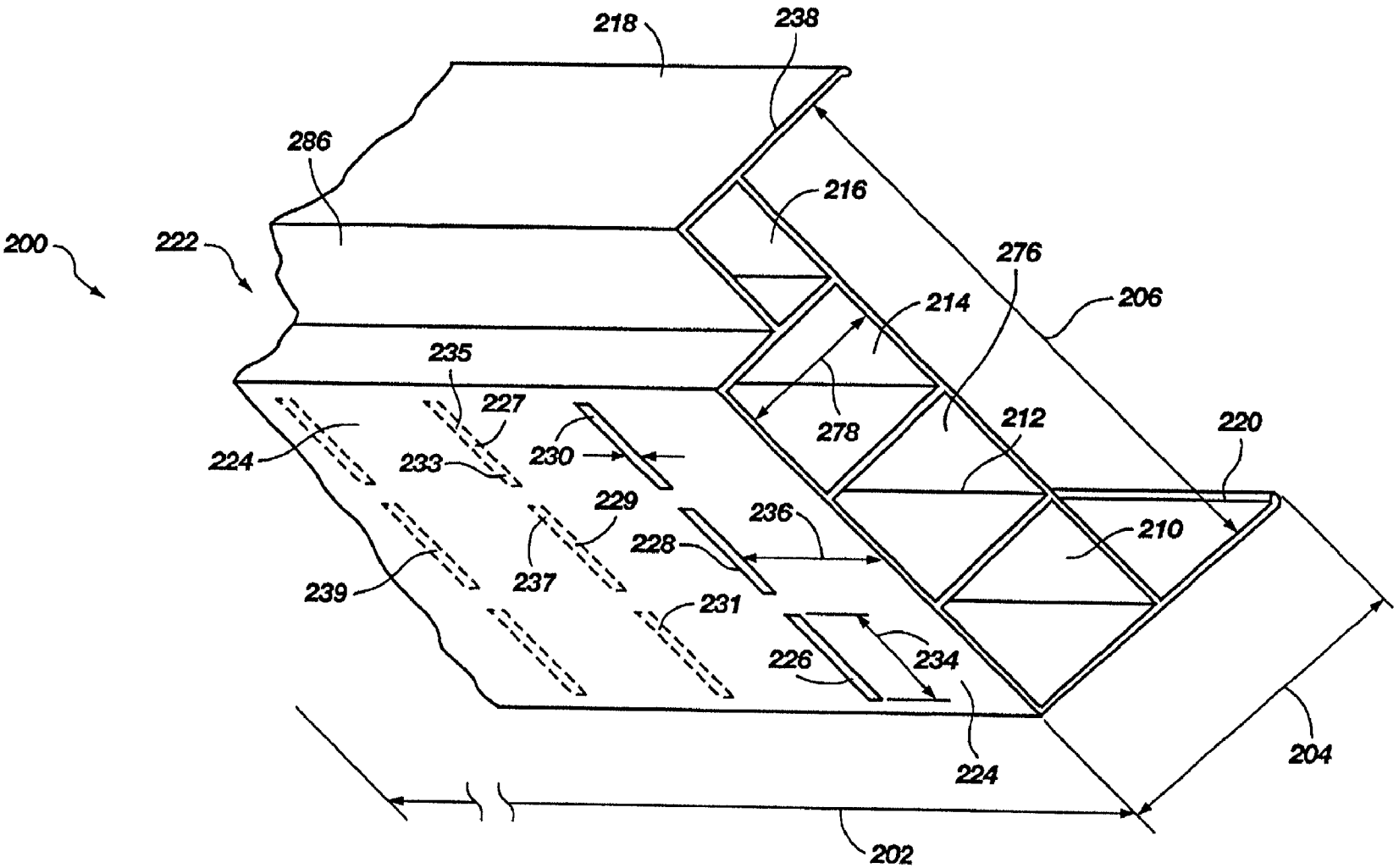
FIG. 8 is a partial perspective view of a female side member of an alternative embodiment of the present invention.

Although reference has been made to a male member having both ends formed as shown in FIG. 9 and a female member with both of its ends formed as shown in FIG. 8, it may be understood that a side member may be so arranged or may have one female end and one male end.

Figure 11:
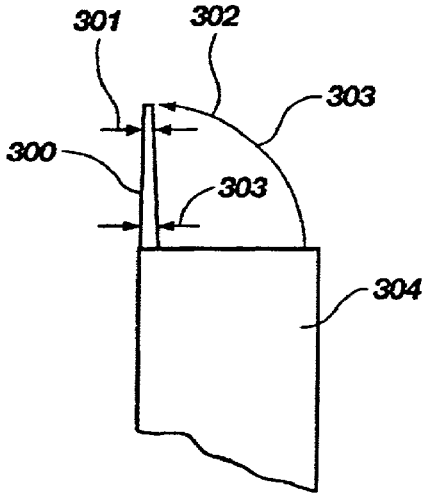
FIG. 11 is a partial side view of an alternative male member of an alternative embodiment of the present invention.

As can be seen in FIG. 11, a tongue 300 may be preformed in the channels and may be simply rotated 302 from the channel in the side member 304. The tongue 300 is formed to be tapered in width. It has a smaller width 301 near the top in relation to the width 303 near the bottom. The width 303 is selected to form a snug friction fit with a corresponding slot in a female member.

Figure 12:
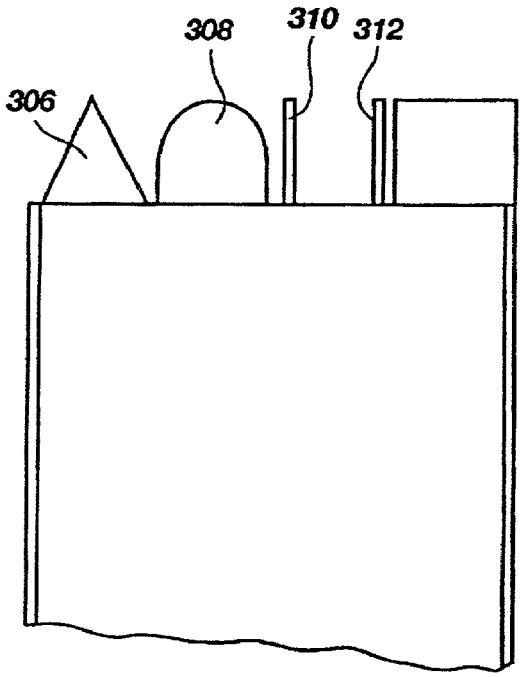
FIG. 12 is a partial side view of alternative tongues of a male member of the alternative embodiment of FIG. 9 of the present invention.

As depicted in FIG. 12, a tongue can be formed in a variety of shapes including triangular, rounded 308 or to be two spaced apart fingers or pins 310 and 312. The spaced apart fingers or pins 310 and 312 are spaced apart a distance so that the pins may snugly fit into one corresponding slot in the female side member.

Figure 13:
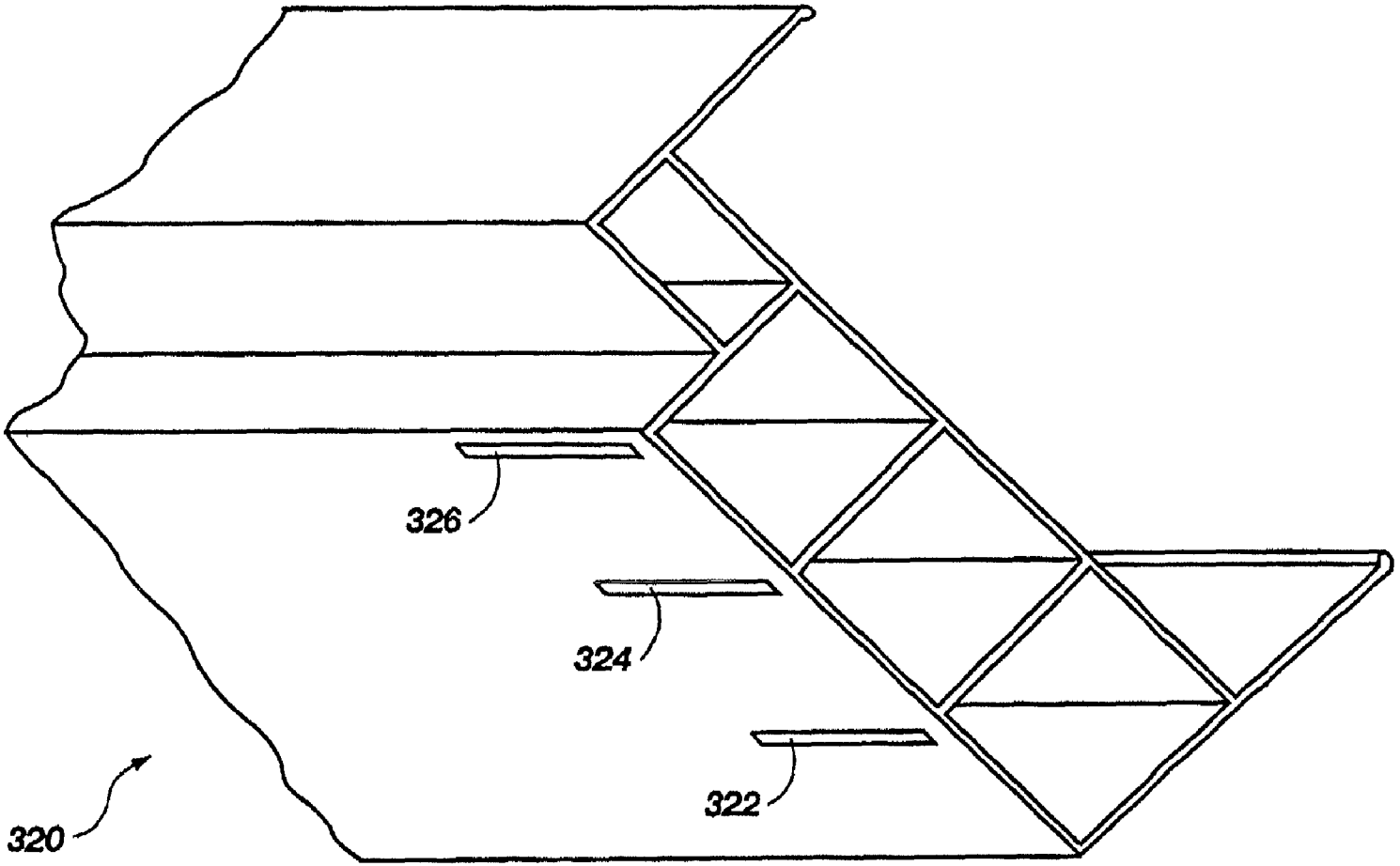
FIG. 13 is a partial perspective view of an alternative configuration of a female side member of an alternative embodiment of the present invention.

Referring now to FIG. 13, an alternative female side member 320 is shown. It is comparable to the female side member of FIG. 8 but for the slots 322, 324 and 326 which are all oriented lengthwise or along the length of the female side member. Of course the orientation of the tongues of the male members would necessarily need to be reconfigured to register with the slots 323, 324 and 326.

Figure 14:
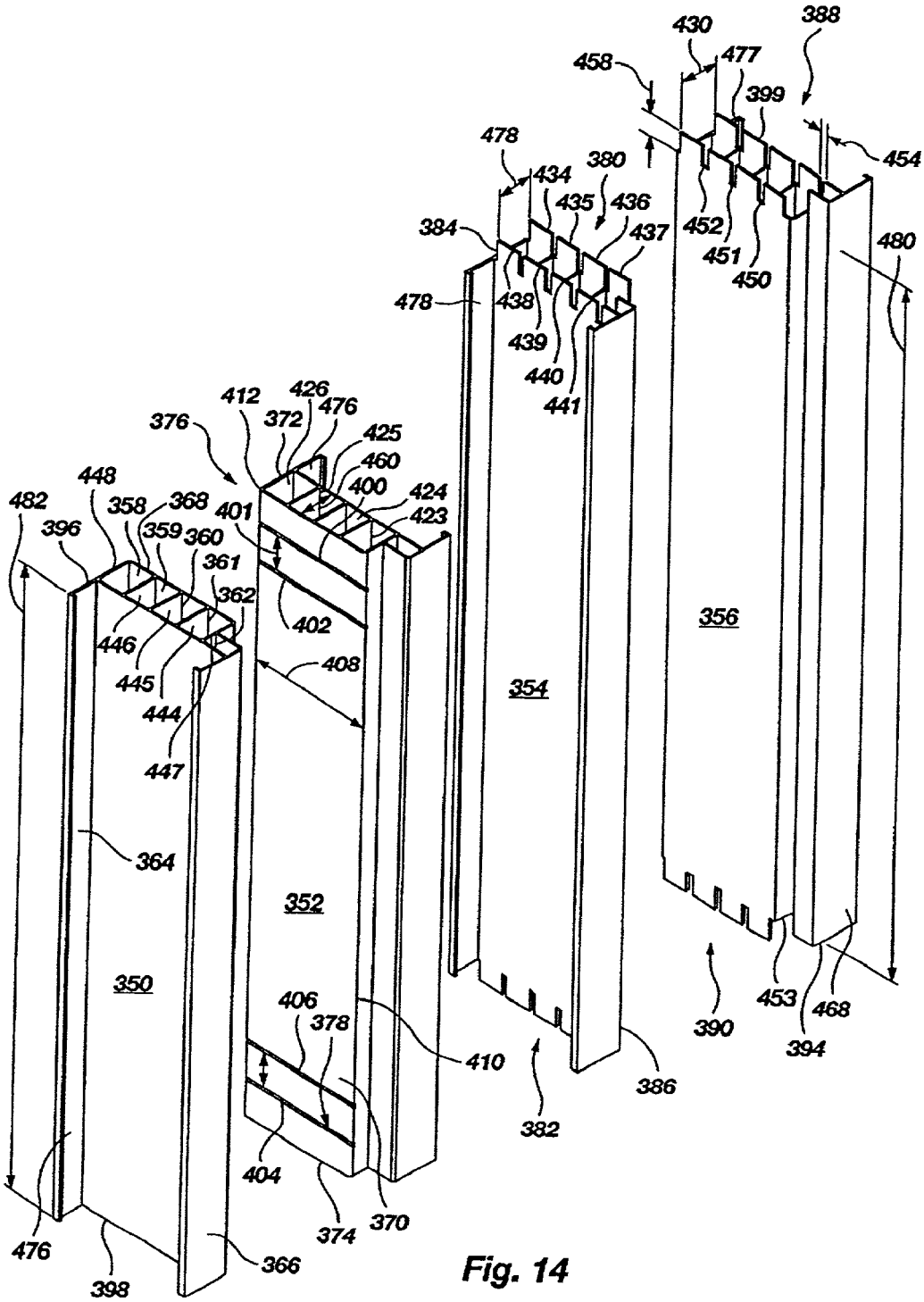
FIG. 14 is perspective view of side members suitable for use in forming a window buck of the present invention.
Figure 15:
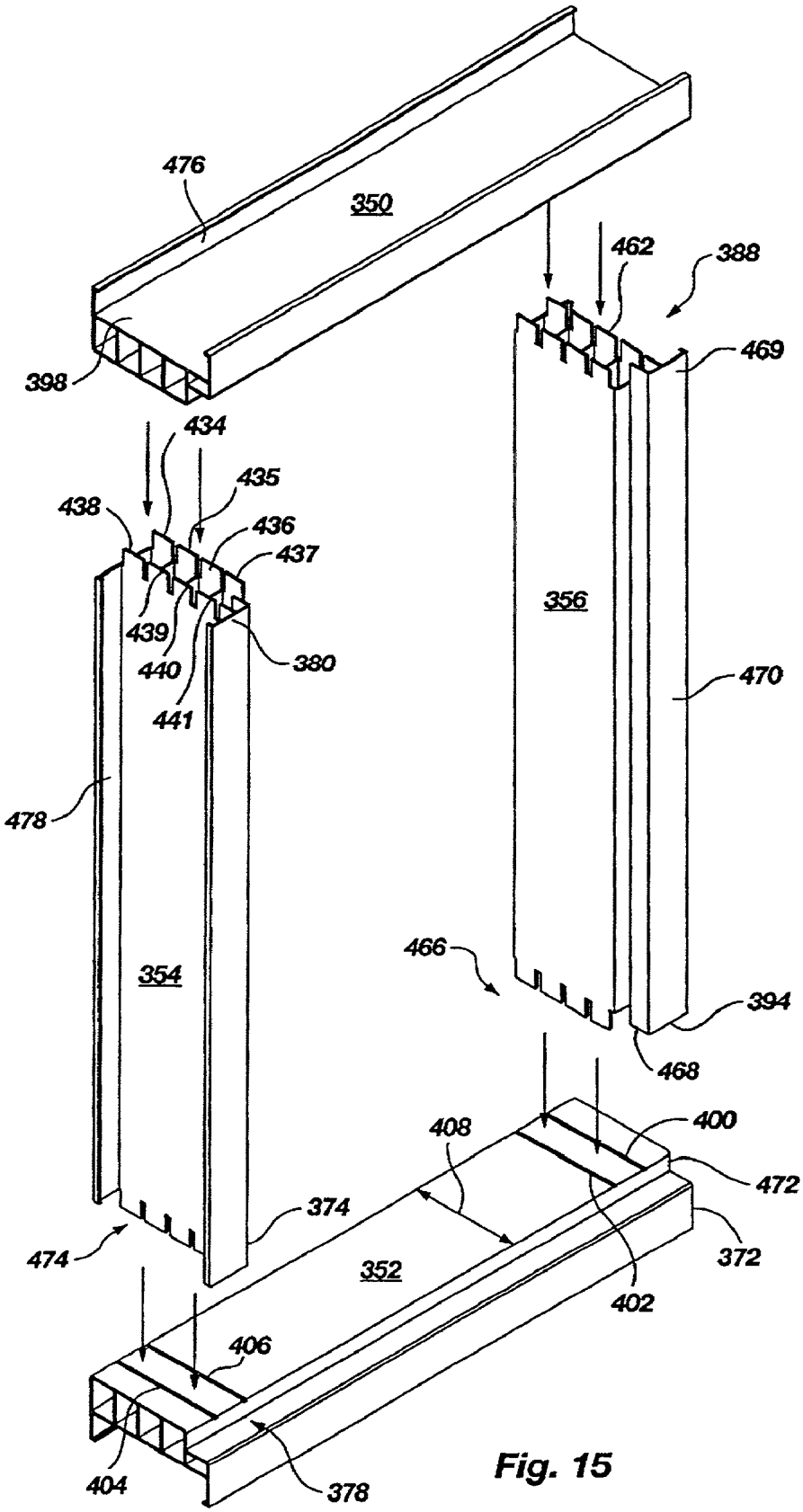
FIG. 15 is a perspective view of the side members of FIG. 14 positioned for assembly into a window buck of the present invention.
Figure 16:
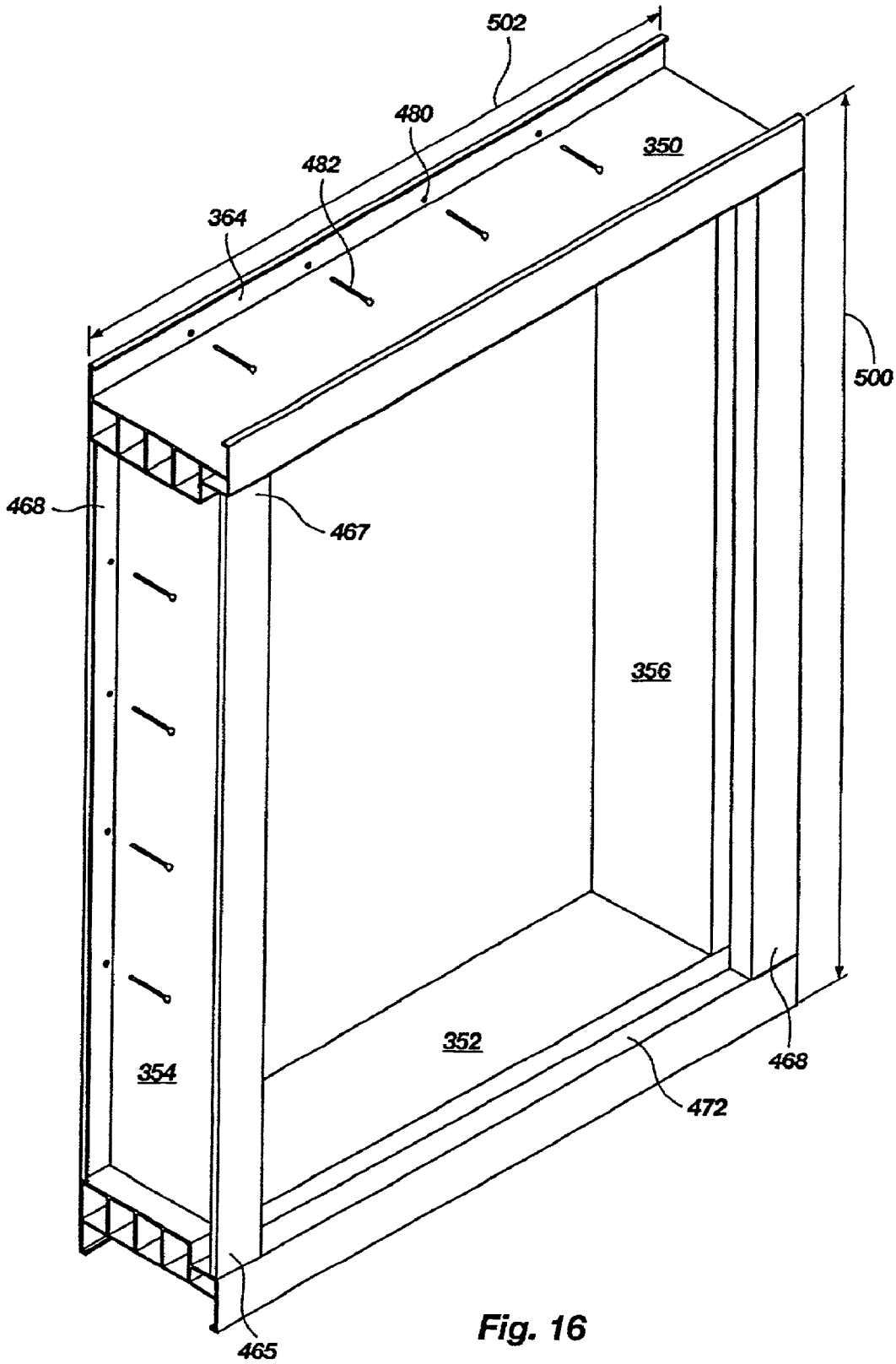
FIG. 16 is a perspective view of the side members of FIG. 14 assembled into a window buck of the present invention.

In FIGS. 14-16, four side members 350, 352, 354 and 356 are shown. Each side member such as side member 350 has a plurality of side-by-side channels such as channels 358, 359, 360,361 and 362 for side members 350. The channels 358-362 are similar to those described in more detail in FIGS. 2, 3, 8 and 9. Each side member such as side member 350 also has an exterior flange 364 and an interior flange 366 comparable to the flanges or extensions 72 and 82 in FIG. 2, extensions 134 and 132 in FIG. 3 and extensions 220 and 238 shown in FIG. 8.

In FIG. 14, it can be seen that side members 350 and 352 are virtually identical and are oriented and differ only in that they each have an interior surface 368 and 370 which are facing each other. As best seen with respect to the side member 352, first end 372 and the second end 374 are both formed to be substantially the same. That is, each are here shown to have connecting means which is female structure 376 and 378 configured to connect with male structure 380 and 382 positioned at the first end 384 and the second end 386 of side member 354 or male structure 388 and 390 associated with the first end 392 and the second end 394 of the side member 356. The female structure is associated with both ends 396 and 398 of the side member 350. However, the female structure of the side member 350 cannot readily been seen because of the orientation of the side member 350 in the illustration of FIG. 14.

The female structure 376 and 378 shown for the side member 352 includes a first groove 400 and a second groove 402. Similarly, the other female structure 378 contains a first groove 404 and a second groove 406. The grooves 400, 402, 404 and 406 each extend the complete width 408 of the interior surface 370 of the side member 352. That is, they extend from the edge 410 to the edge 412.

Figure 17:
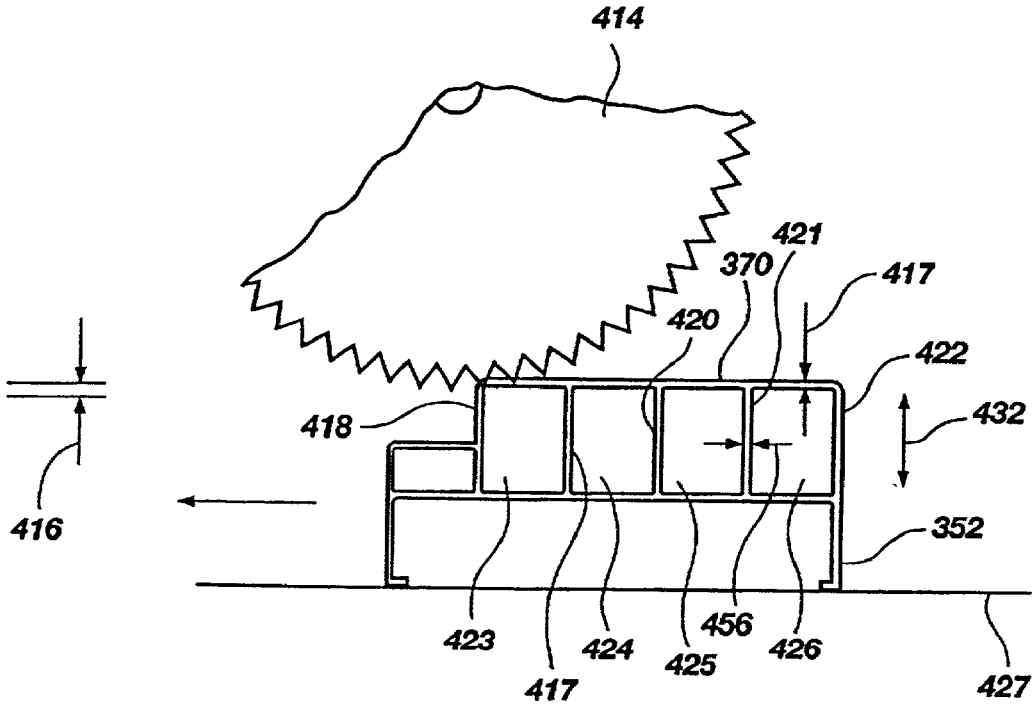
FIG. 17 is a simplified illustration of a saw used in the formation of side members used with window bucks of the present invention.

In practice, the groove 400, 402, 404 and 406 are formed as seen in FIG. 17. That is, a saw blade 414 is shown positioned to cut a groove in the interior surface 370. The associated drive mechanism for operating the saw blade in a conventional manner is not illustrated for purposes of simplicity. Any convenient table saw or radial arm saw will be suitable for achieving the purposes as hereinafter described. Mechanisms other than saws may be used including grinding wheels and friction discs to create a groove in a vinyl material or other material used to fabricate the side members 350, 352, 354 and 356.

In FIG. 17, the saw blade 414 is shown cutting a groove which is of a selected depth 416. The depth 416 is selected to be more than the thickness 417 of the interior surface 370 of the member 352. Thus the groove 400 as well as other grooves 402, 404 and 406 can all be formed so that individual slots are defined by the channel walls 418, 419, 420, 421 and 422 to provide access to the interior of each of the plurality of channels such as channels 423-426. The groove, such is grooves 400, 402, 404 and 406, is formed by moving the side member 352 on a saw table top 427 as the saw blade 414 rotates to make the cut.

It can be seen that a saw can be devised in which two or four blades are operating so two or four grooves 400, 402, 404 and 406 can be formed simultaneously with one movement of the side member 352.

The grooves such as groove 400 and 402 are spaced apart a distance 401 which is the same as the distance 428 which in effect the height 432 of each of the channels of each of the side members such as channels 423-426 in side member 352.

In reference to the side members 354 and 356, it can be seen that each has tongue structure which is a plurality of tabs or tongues 434, 435, 436, 437, 438, 439, 440 and 441. The tabs 434-441 are formed by using a saw blade such as saw blade 414 and cutting grooves which coincide with the interior sidewalls such as interior side walls 444, 445 and 446 shown for the channels 358-362 for side member 350. More specifically, the tongues 434-441 are formed by making cuts which remove the interior sidewalls such as sidewall 444-446 as well as the sidewalls 447 and 448 down a distance selected to form tongues 434-441. The saw blade creates a slot or groove such as slot 450, 451 and 452. The slots 450-452 have a width 454 which is defined by the width of the saw blade 414 which also coincides with and is slightly more than the width 456 of the interior sidewall 444-446 as well as sidewalls 448 and 447.

The tongues 434-441 each are cut to a depth 458 which is less than the depth 460 of each of the channels such as channels 358-361.

As seen in FIG. 15, the side member 350 is oriented with its slots in the first end 396 (not shown) to register with the male structure 388 and more particularly the plurality of spaced-apart tongues 462 formed in the first end 392 of the member 356. Similarly the slots not shown in the second end 398 of the side member 350 register with plurality of tongues 437-441 formed in the first end 384 of the side member 354. Similarly, the plurality of tongues 466 in the second end 394 of the side member 356 are positioned to register with the slots 400 and 402 at the first end 372 of side member 352. It may also be noted that the slot 453 (FIG. 14) creates an extension 468 so that a snug fit of the extension 468 is effected in the window receiving groove 472 as better seen in FIG. 16. A similar extension 469 is formed at the first end 390 of side member 356. Similar extensions 467 and 465 are formed in side member 354 as illustrated In FIG. 15, the second end 374 of the side member 354 has male structure 382 in the form of tongue structure 474 that registers with the grooves 404 and 406. The male structure 382 of the first end 384 registers with the female structure (not shown) in the first end 396 of the side member 350.

Since the saw blade 414 is selected to have substantially the same width as the thickness of the interior surface 370 of a side member and the interior sidewalls such as sidewalls 444-446 of the channels 358-361, it can be understood that a snug fit is effected between the tongues such as tongues 434-441 and the corresponding slots such as slots 400, 402, 404 and 406.

In some instances, a user may add a glue such as an epoxy resin or other similar material in order to enhance or strengthen the connection if desired.

As can be seen in FIG. 16, the side members 350, 352, 354 and 356 are assembled to form a rectangular-shaped window buck. It can be seen that the exterior flanges 364, 476, 477 and 478 are shown with a plurality of dots 480 to illustrate scribes or apertures through which screws or nails may be inserted to secure the window buck shown in FIG. 16 to the wall of an associated form or one of a pair of forms used to define a cement wall. Nails such as a nail 482 may be driven through one or more of the apertures 480 or through the flanges 364, 476, 477 and 478 at any desired location. The window buck, though particularly useful and suitable for use with cement walls may also be used in wooden wall construction in selected, desired applications.

To install a window buck such as that shown in FIG. 16, the cement forms such as forms 79 and 81 in FIG. 2 are first provided. Preferably one form, such as form 79, is installed and positioned. The window buck such as that shown in FIG. 16 is positioned on the wall at a desired location and secured in place by nails such as nails 482. Alternately, other fasteners including glues or anything else to maintain a secure relationship may be employed. Alternately, the buck may be supported by a rebar structure positioned under it.

The other portion of the cement form 81 is then positioned in place and secured. Thereupon cement is poured into the form to define and create the cement wall. The cement is poured around and then over the window buck. Once the cement cures or dries, the form such as forms 79 and 81 are removed leaving an erect wall with a window buck defining a window opening. Thereupon a window such as window 20 may be inserted into the window groove 472 (FIG. 16).

It may be also noted that the use of two sets of tongues 434-437 and 438-441 to associate with corresponding grooves such as grooves 400 and 402 effect a more stable, rigid relationship to facilitate installation. That is, one side such as side member 356 could be associated and connected with side member 352. The double slot and double groove arrangement provide for more stable connections so that the assembly remains freestanding while the user continues to assemble the other sides such as side 350 and 354.

It may be noted with particularity that the window buck of FIG. 16 is formed using two identical members 350 and 352 which have female structure such as female structure 376 and 378 formed at their opposite ends. Similarly the other side members 354 and 356 are identical and have corresponding male structure 380 and 382 as well as 388 and 390 formed at their respective opposite ends.

In operation, a user may find it convenient to collect side members of different sizes in a single collection. That is, a collection of side members such as side member 354 of a particular size may be stored next to a collection of side members such as side members 350 and 352. Next to that, another series of side members having height or length 480 that differs from the height or length of members 350, 352, 354 and 356 may be provided. Similarly, additional side members having other lengths or heights 482 (FIG. 14) may be provided in yet another adjoining storage location.

Thus, a user may be able to quickly assemble window bucks of different dimensions by simply collecting a pair of side members having female structure and a pair of side members having male structure. Window bucks of different sizes may be quickly and easily assembled by simply assembling the desired side members to effect assembly of a window bucks having different desired heights and widths.

By way of example, one could assume that one desired window buck would have a height 500 of two feet and a width 502 of two feet. Another window buck would have a height 500 of two feet and a width 502 of three feet.

It can also be seen that side members which may be regarded as female side members such as side member 350 and 352 may be separately collected (e.g., on a pallet or in a bin) having a width 502 of two feet. Another group of side members similar in shape and form to those 350 and 352 having a width of three feet may be separately assembled in an adjoining or nearby location. Further, a number of side members such as side members 354 and 356 having a height of two feet may be in another nearby location. Thus, to assemble a window buck having a height of two feet and a width of two feet, one need only assemble two female members having a width 502 of two feet and two male members having a height 500 of two feet in order to have a window buck that is two feet by two feet.

To have a window buck that is two feet by three feet, the user need assembly only two side members of two foot height and two female members such as members 350 and 352 having a width of three feet. Similarly, if a user desired a window having, for example, a width 502 of three feet and a height 500 of three feet, a user could then go to a separate nearby location to acquire two side members such as side members 354 and 356 having a height of three feet combining the side members that are three feet in height with the side members are three feet in width 502 produces a three foot by three foot window buck.

The above-referenced dimensions are purely theoretical and are not intended to in fact reflect what the standardized size may be for given standardized windows. However, the sizes do illustrate the fact that different sizes of different window bucks may be assembled by simply assembling side members having the desired widths and heights to define the desired window openings. In turn, the number of overall side members that need to be inventoried can be reduced or controlled not only by the manufacturer, but also by the distributor as well as by the customer.

Figure 18:
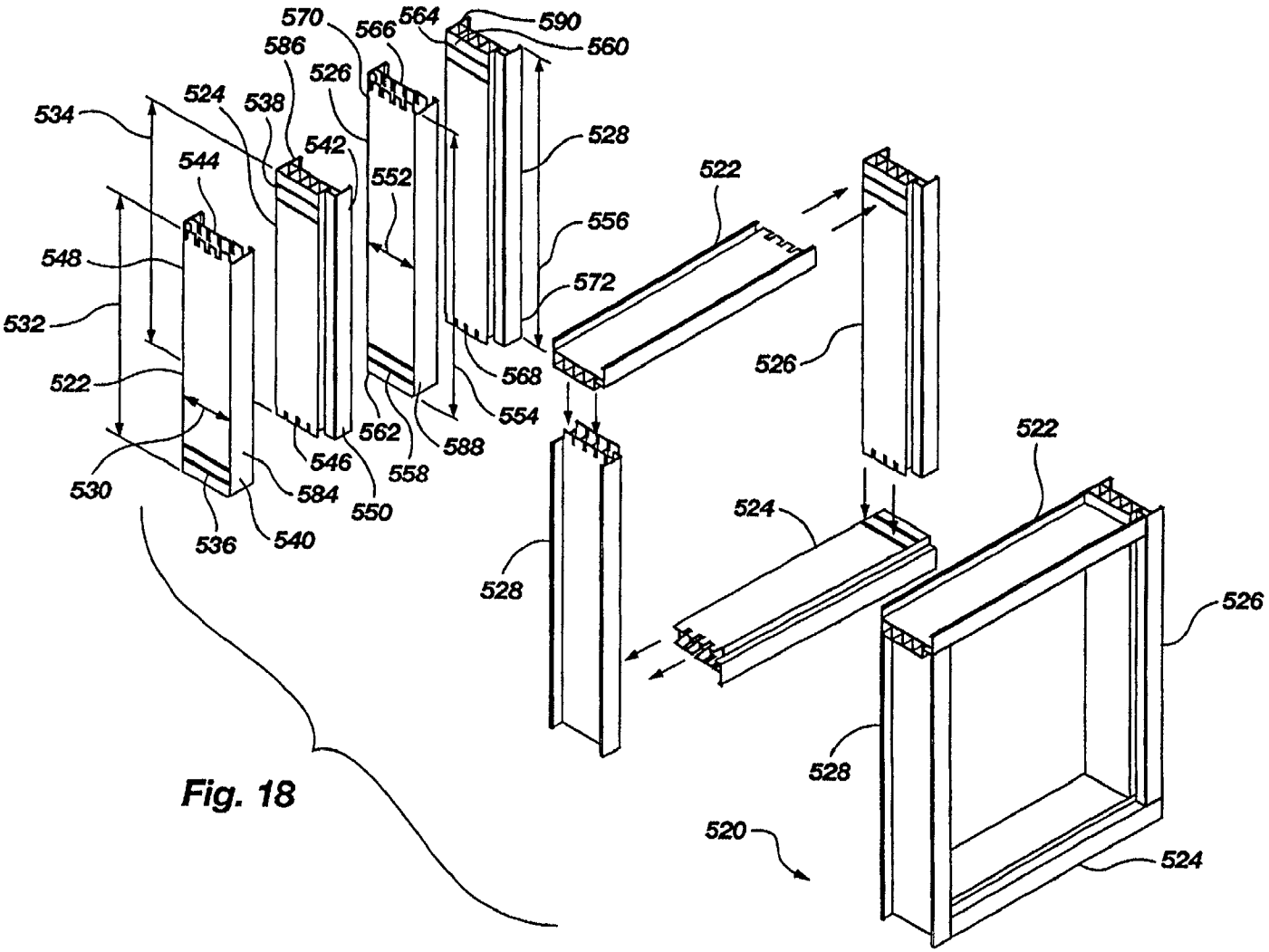
FIG. 18 is a simplified perspective illustration depicting the steps for assembling a window buck of the present invention.

Turning now to FIG. 18, a preferred window buck 520 is depicted being formed by the assembly of a pair of identical first side members 522 and 524 and a pair of identical second side members 526 and 528, the first side members 522 and 524 have the same width 530 as well as the same lengths 532 and 534. The first side members 522 and 524 also have slot structure 536 and 538 formed in their respective first ends 540 and 542. Of course, they also have tongue structures 544 and 546 formed in their respective second ends 548 and 550.

The pair of second side members 526 and 528 also have the same width 552 which is the same as the width 530 of the pair of first side members 522 and 524. The second side members also have the same lengths 554 and 556 which may be the same as or different from the lengths 532 and 534. The second side members 526 and 528 also have slot structures 558 and 560 formed in their first ends 562 and 564 as well as tongue structures 566 and 568 formed in their respective second ends 570 and 572.

With the first side members 522 and 524 and the second side members 526 and 528 configured, as described, it can be seen that end-to-end assembly can be effected as depicted. End-to-end assembly results in the fully assembled window buck 520.

Because the first side members 522 and 524 are the same and because the second side members 526 and 528 are the same, the user need only have two stock piles or bins rather than four. That is, the user need have only a first stock pile or bin for first side members and a second stock pile or bin for second side members. An additional stock pile or bin may contain third side members all of which are identical to each other so that window bucks of different dimensions may easily be assembled using either the first side members or second side members with the third side members.

Figure 19:
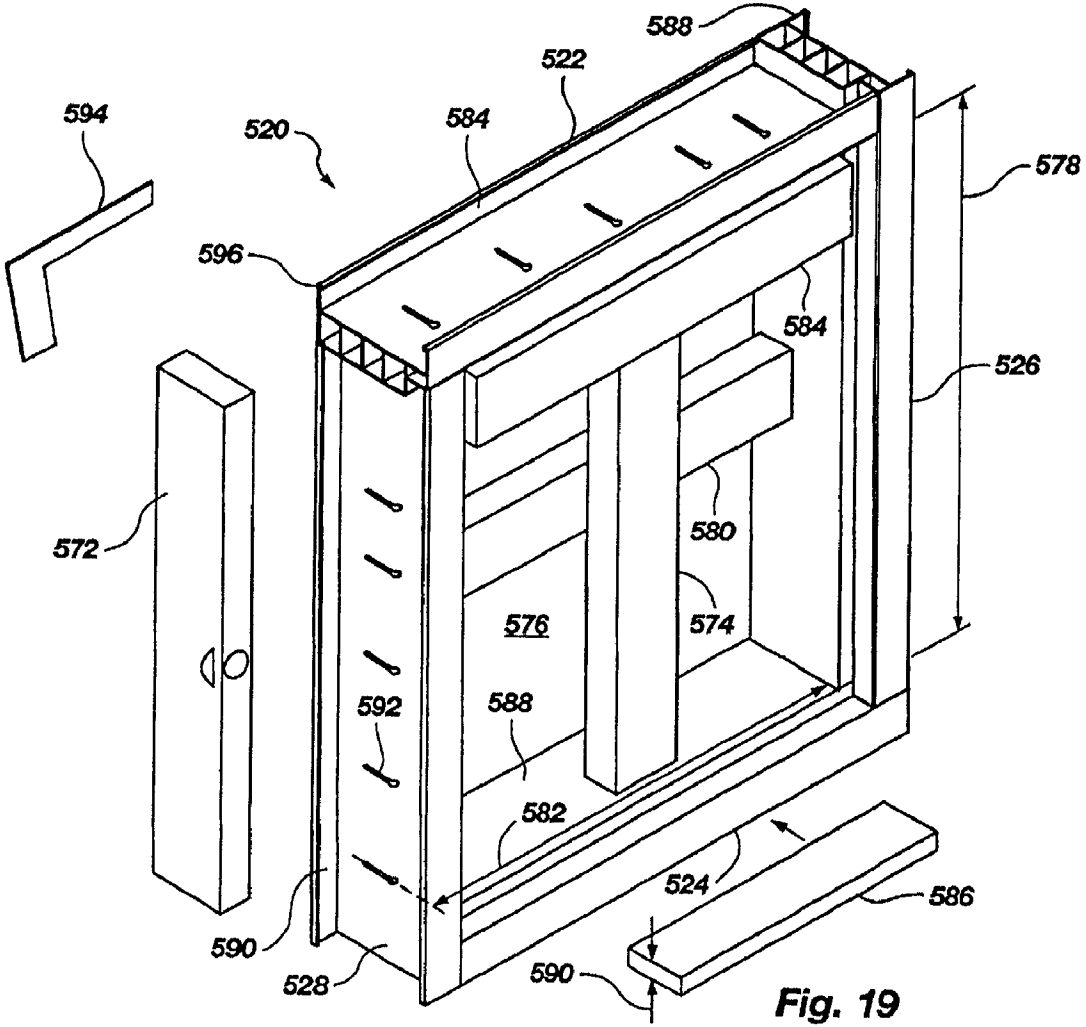
FIG. 19 is a perspective illustration of a window buck of the present invention with cross braces.

FIG. 19 shows an assembled window buck 520 with a first brace 574 positioned in the interior 576 defined by the first side members 522 and 524 and the second side members 526 and 528. The first brace 574 has a length 578 which is essentially the same as the height of the interior 576. The first brace 574 in place stiffens or strengthens the window buck 520 to inhibit collapse during assembly and to inhibit deformation during installation and during formation of the associated wall.

A second brace 580 is also shown extending the width 582 of the interior 576 to stiffen or strengthen the window buck 520 during installation and during formation of the associated wall. A third brace 584 may also be provided. The third brace 584 is sized the same as brace 580 and may be desired to strengthen the window buck to assist in resisting twisting forces that may evolve during installation and during formation of the associated wall. For example, cement may be poured unevenly and stress the window buck 520 as the cement flows thereabout.

FIG. 19 also shows a shim 586 that may be placed between one interior surface 588 and the first brace 574. The first brace would necessarily be shorter in length 578 to accommodate the thickness 590 of the shim 586.

After formation of the wall in which the window buck 520 is placed, the stress or compression force on the first brace 574 may be quite high so that the first brace may need to be removed by use of force. In so doing, the surface 588 could become scratched or otherwise damaged. The shim 586 limits or avoids such damage from the first brace 574. Of course, a similar shim may be used for the other braces 580 and 584.

FIG. 19 also shows the fasteners 592 spaced about the perimeter of the window buck 520 for positioning through the exterior flanges, such as flanges 584, 586 (FIGS. 18), 588 and 590, of the side members 522, 524, 526 and 528.

In FIG. 19, a carpenter's level 592 is shown to illustrate that in the process of assembling the window buck 520, a level 592 is useful to ensure installation of the window buck 520 with a level or horizontal orientation of the interior surface 588 as well as a vertical orientation of the side members 526 and 528. Of course, a carpenter's square 594 may be used in assembling the window buck 520 to ensure the corners, such as corner 596, are truly square or normal.

The embodiments of FIGS. 8 to 18 are preferred because they do not require use of a separate locking member to form the corners of a rectilinear window buck or to connect the ends of a side member or side members to form a desired window buck. Thus in use, a window buck of desired dimensions may be packaged to contain two female side members and two male side members.

It should be recognized that the window buck of the present invention provides for simple transportation inasmuch as it need not be pre-assembled. Rather, it may be shipped disassembled with its components shrink-wrapped together or otherwise packaged to contain the various side members with or without locking members. Upon arrival of the package at the construction site, the window buck components may be unpackaged and easily assembled at the time of installation. Damage while in storage and before use at the site is thereby minimized. Thereafter, the window buck may be easily placed in between the forms that are then positioned to form the cement wall so that upon pouring the cement wall, the window buck is in position to make further window construction simple and easy.

What is claimed is:

1. A window buck for forming a window frame opening in a wall, said window buck comprising:

side member means assembled to define a window frame opening, said side member means being formed to have:

a perimeter, a width adapted to be substantially the width of a wall into which the window buck is to be placed,

*a substantially planar interior surface extending along said perimeter and having a width substantially the same as said width of said wall, said interior surface having a first planar surface and a second planar surface, said second planar surface being sized and configured to receive a portion of a frame of a window, said second planar surface spaced a distance below relative to said first planar surface,*

*an interior flange connected to and extending away from said interior surface,*

*an exterior flange connected to and extending away from said interior surface, said exterior flange being spaced from said interior flange a distance to receive said wall there between,* a plurality of at least three *side by side* internal channels [of], each of said *side by side internal* channels [being in a side by side relationship and coaxial with] *having a* common [walls] *wall with an adjacent channel*, [and] each of said *side by side internal* channels *having said first planar surface as another wall thereof, and each of said side by side internal channels* being hollow and extending along said perimeter, [and]

*a window frame channel, said window frame channel having a common wall with at least one of said side by side channels, said window frame channel having said second planar surface as another wall thereof, said window frame channel being hollow and extending along said perimeter,*

*a separating wall formed from a portion of said side by side channel having a common wall with said window frame channel, said separating wall having a length equal to said distance said second planar surface is located relative to said first planar surface, said separating wall being configured to abut a portion of said frame of said window, and*

*a first end and a second end spaced from said first end along said perimeter, said first end and said second end being formed to abut one another*

[at least two ends each formed to abut the other proximate the end of the other]; and

[connector means for] *a locking member* holding said [at least two ends] *first end and said second end* in abutment to each other, said [connector means being a] locking member having [one] *a first* end sized and shaped for insertion into and engagement with any one of said plurality of *adjacent internal* channels [in one of said at least two ends] *at said first end* and having [another] *a second* end sized and shaped for insertion into and engagement with a corresponding any one of said plurality *of* channels [in the other of said at least two ends] *at said second end*.

2. The window buck of claim 1, wherein said locking member has friction means proximate [each of its ends and formed therewith to] *said first end and said second end for* frictionally [engage said selected channel] *engaging a channel of said plurality of channels* in [one] *said first* end of said side member means and the corresponding [selected] channel *of said plurality of channels* in [the other] *said second* end of said side member means.

3. The window buck of claim 1, wherein said side member means includes a plurality of separate [sides] *side members*, each of which is formed to have two ends, [both of which abut proximate one end of another side member] *wherein each of said two ends of each of said plurality of separate side members abuts an end of an adjacent side member of said plurality*

*of separate side members, wherein each end of each of said plurality of separate side members is connected to an end of an adjacent side member by locking member to form said window buck and wherein each of said locking members has a first end sized and shaped for insertion into and engagement with any one of said plurality of channels in one of said two ends of each of said plurality of separate side members and a second end sized and shaped for insertion into and engagement with a corresponding any one of said plurality of channels at the other of said two ends of each of said plurality of separate side members.*

4. [The] *A* window buck [of claim 1, wherein said side member means is formed to define] *for forming* a circular shaped [perimeter] *window frame opening in a wall, said window buck comprising:*

*arc shaped side member means assembled to define a window frame opening, said arc shaped side member means being formed to have:*

*a perimeter defining a circle,*

*a width adapted to be substantially the width of a wall into which the window buck is to be placed,*

*a plurality of adjacent internal channels, each of said adjacent internal channels having a common wall with said adjacent channel, and each of said adjacent internal channels being hollow and extending along said perimeter, and*

*a first end and a second end spaced from said first end along said perimeter, said first end and said second end being formed to abut one another; and*

*a locking member holding said first end and said second end in abutment to each other, said locking member having a first end sized and shaped for insertion into and engagement with any one of said plurality of adjacent internal channels at said first end and having a second end sized and shaped for insertion into and engagement with a corresponding any one of said plurality of channels at said second end.*

5. The window buck of claim [2] *3*, wherein said side member means is four separate [sides] *side members* assembled to define a rectilinearly shaped window buck.

6. A window buck for forming a window frame opening in a wall, said window buck comprising:

side member means for defining a window frame opening, said side member means being formed to have:

a perimeter for extending about the window frame opening, [and]

*an interior surface extending along said perimeter and having a width substantially the same as said width of said wall, said interior surface having a first planar surface and a second planar surface, said second planar surface being sized and configured to receive a portion of a frame of a window, said second planar surface spaced a distance below relative to said first planar surface,*

*an interior flange attached to and extending inward from said interior surface, and*

*an exterior flange spaced from said interior flange with said wall there between, said exterior flange being attached to and extending inward from said interior surface,* a first end and a second end [each having a plurality of at least three side by side openings], *said first end having a first plurality of at least three side by side openings to a plurality of at least three side by side internal channels, each of said side by side internal channels having a common wall with an adjacent channel, each of said side by side internal channels having said interior surface as another wall thereof, and each of said side by side internal channels being hollow and extending along said perimeter and said second end having a second plurality of at least three side by side openings to a plurality of at least three side by side internal channels, each of said side by side internal channels having a common wall with an adjacent channel, each of said adjacent internal channels having said interior surface as another wall thereof, and each of said adjacent internal channels being hollow and extending along said perimeter;*

*a window frame channel, said window frame channel having a common wall with at least one of said side by side channels, said window frame channel having said second planar surface as another wall thereof, said window frame channel being hollow and extending along said perimeter,*

*a separating wall formed from a portion of said side by side channel having a common wall with said window frame channel, said separating wall having a length equal to said distance said second planar surface is located relative to said first planar surface, said separating wall configured to abut a portion of said frame of said window*; and connector means [formed for] mechanically connecting said first end and said second end, said connector means being a locking member which has a first member sized and shaped for insertion into and engagement with a selected one of said first plurality of openings in said first end and which has a second member sized and shaped for insertion into and engagement with a corresponding selected one of said second plurality of openings in said second end.

[7. The window buck of claim 6, wherein said side member means includes a plurality of channels each of which is hollow and each of which is in communication with a said opening.]

8. The window buck of claim [7] *6*, wherein said first member has first friction means associated therewith for frictionally engaging said selected one of said first plurality of openings, and said second member has second friction means associated therewith for frictionally engaging said selected one of said second plurality of openings.

9. The window buck of claim 8, wherein said first member and said second member of said locking member are unitarily formed and oriented at a right angle relative to each other.

10. The window buck of claim 8, wherein said side member means includes a first side member having a first end and a second end, and a second side member having a first end and a second end, and wherein said first end of [both] said first side member [and said second side member] and the second end of [both] said first side member and[said second side member are formed to abut each other] *and wherein said first end of said first side member and said second end of said second side member are connected to one another by a locking member.*

11. The window buck of claim 10, wherein said first member is oriented [to be] normal relative to said second member.

12. The window buck of claim 11, wherein said first side member and said second side member both have a width and a longitudinal axis, and wherein said first end of [both] said first side member and said *second end of said* second side member [are] *terminate* at an angle of about 45 degrees transverse to the said longitudinal axis.

13. The window buck of claim [7] *6* wherein said side member means includes [four sides, each of which four sides is formed to have a said first end and a said second end, said first end and said second end of each of said four sides being assembled with a locking member for connecting the first end of one to the second end of another of each of said four sides, and wherein said four sides when assembled with a first end of one connecting to the second end of another define a window frame opening which is multi-sided in projection] *a first side member, a second side member, a third side member and a fourth side member, each of said side members having a first end and a second end, and a plurality of at least four locking members for connecting the ends of adjacent side members together so as to form said side member means, and wherein said second end of said first side member is connected to and abuts said first end of said second side member, said second end of said second side member is connected to and abuts said first end of said third side member, said second end of said third side member is connected to and abuts said first end of said fourth side member and said second end of said fourth side member is connected to and abuts said first end of said first side member.*

14. The window buck of claim 13, wherein said window frame is rectangular in projection.

15. The window buck of claim [13] *6*, wherein said interior flange and said exterior flange are spaced apart and formed to receive fluidized [cement] *concrete* thereinbetween.

16. The window buck of claim 13, wherein said interior flange [and said exterior flange each have a distal edge have a bead portion each oriented toward the other] *has a distal edge with a bead portion mounted thereon and oriented toward said exterior flange and wherein said exterior flange has a distal edge with a bead portion mounted thereon and oriented toward said interior flange.*

17. The window buck of claim [7] *6*, wherein said side member means is formed to define a non-rectangular shaped perimeter when assembled with said first end abutting said second end.

18. A window buck for forming a window frame opening in a wall having an interior surface, said window buck comprising:

side member means assembled to define a window frame opening, said side member means being formed to have:

a perimeter, a width adapted to be substantially the width of a wall into which the window buck is to be placed, a plurality of *at least three* internal channels each side by side and hollow and extending along said perimeter,

*a substantially planar interior surface facing toward said window opening, said interior surface extending along said perimeter and having a width substantially the same as said width of said wall, said interior surface having a first planar surface and a second planar surface, said second planar surface being sized and configured to receive a portion of a frame of a window, said second planar surface spaced a distance below relative to said first planar surface,* an interior [surface facing toward said window opening] *flange attached to and extending away from said interior surface and adapted to extend along the interior surface of said wall,* an [interior] *exterior* flange *attached to and* extending away from said interior surface and adapted to extend along the [interior surface] *exterior* of said wall[, and]

*a window frame channel, said window frame channel having a common wall with at least one of said internal channels, said window frame channel having said second planar surface as another wall thereof, said window frame channel being hollow and extending along said perimeter,*

*a separating wall having a surface that is contiguous with said first planar surface and said second planar interior surface, said separating wall being formed from a portion of said internal channel having a common wall with said window frame channel, said separating wall having a length equal to said distance said second planar interior surface is located relative said first planar interior surface, and said separating wall being configured to abut a portion of said frame of said window; and* at least two ends each formed to abut the other proximate the end of the other; and connector means for holding said at least two ends in abutment to each other.

[19. The window buck of claim 18, wherein said interior flange is joined to said interior surface.]

[20. The window buck of claim 19, wherein said wall has an exterior surface spaced from said interior surface, wherein an exterior flange extends away from said interior surface and is adapted to extend substantially along the exterior surface of said wall.]

[21. The window buck of claim 20, wherein said exterior flange is joined to said interior surface.]

22. The window buck of claim [21] *18*, wherein said exterior flange is sized to extend away a distance selected so that fasteners may be positioned therethrough to secure said side member in a desired location.

23. The window buck of claim 22, wherein said exterior flange and said interior flange are formed to receive cement thereinbetween.

24. The window buck of claim 23, wherein said exterior flange and said interior flange have a node adapted for attachment to a cement wall.

25. A window buck for forming a window frame opening in a wall, said window buck comprising:

side member means assembled to define a window frame opening, said side member means being formed to have:

a perimeter, a width adapted to be substantially the width of a wall [into] *in* which the window buck is [to be placed] *positioned*,

*a substantially planar interior surface extending along said perimeter and having a width substantially the same as said width of said wall, said interior surface having a first planar surface and a second planar surface, said second planar surface being sized and configured to receive a portion of a frame of a window, said second planar surface spaced a distance below relative said first interior planar surface,*

*an interior flange connected to and extending away from said interior surface,*

*an exterior flange connected to and extending away from said interior surface, said exterior flange being spaced from said interior flange a distance to receive said wall there between,* a plurality of internal channels [of substantially the same size in cross section, each of said channels being coaxial and], *each of said internal channels being* aligned in a row with each of said channels being hollow and extending along said perimeter, *each of said internal channels having said first planar surface as a wall thereof*, and at least two ends each formed to abut the other proximate the end of the other; and a locking member [for] holding said at least two ends in abutment to each other, said locking member having one end sized and shaped for insertion into and engagement with any one of and each of said plurality of channels in one of said at least two ends and having another end sized and shaped for insertion into and engagement with a corresponding any one of and each of said plurality channels in the other of said at least two ends.

*26. A window buck for use in forming a window frame opening in a wall to be formed with an interior wall surface and an exterior wall surface spaced from said interior wall surface, said wall to be formed from fluidized concrete or the like, said window buck comprising:*

*side member means assembled to define a window frame opening in said wall, said side member means having:*

*a perimeter adapted to be substantially the perimeter of said window frame opening,*

*a width adapted to be substantially the width of said wall,*

*an inner surface facing inward toward said window frame opening,*

*an outer surface spaced from said inner surface and facing away from said window frame opening,*

*a plurality of internal channels positioned between and joined both to said inner surface and to said outer surface, said internal channels being hollow, arranged in a side by side relationship and extending along said perimeter,*

*an interior flange joined to and extending away from said outer surface, said interior flange being adaptable for positioning along the interior wall surface, said interior flange having a member extending therefrom and adaptable for engagement with said wall, and*

*a first end and a second end spaced from said first end along said perimeter, said first end and said second end being formed to abut one another; and*

*connector means holding said first end and said second end in abutment to each other, said connector means being a locking member having a first end sized and shaped for insertion into and engagement with any one of said plurality of channels at said first end and having a second end sized and shaped for insertion into and engagement with a corresponding any one of said plurality channels at said second end.*

*27. The window buck of claim 26, wherein said interior flange and said exterior flange are positioned to receive fluidized concrete or the like thereinbetween.*

* * * * *